US012646461B2

(12) United States Patent
Choi et al.

(10) Patent No.: US 12,646,461 B2
(45) Date of Patent: Jun. 2, 2026

(54) DISPLAY DEVICE AND METHOD OF DRIVING THE SAME, AND ELECTRONIC DEVICE INCLUDING DISPLAY DEVICE

(71) Applicant: Samsung Display Co., LTD., Yongin-si (KR)

(72) Inventors: Hak Mo Choi, Yongin-si (KR); Se Yun Kim, Yongin-si (KR); Hyung Woo Yim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/938,582

(22) Filed: Nov. 6, 2024

(65) Prior Publication Data

US 2025/0279049 A1 Sep. 4, 2025

(30) Foreign Application Priority Data

Mar. 4, 2024 (KR) ........................ 10-2024-0030847

(51) Int. Cl.
*G09G 3/3233* (2016.01)
*G09G 3/32* (2016.01)

(52) U.S. Cl.
CPC ............ *G09G 3/3233* (2013.01); *G09G 3/32* (2013.01); *G09G 2310/08* (2013.01); *G09G 2320/0233* (2013.01); *G09G 2320/0257* (2013.01); *G09G 2320/0276* (2013.01); *G09G 2320/0285* (2013.01); *G09G 2320/0626* (2013.01); *G09G 2330/021* (2013.01); *G09G 2330/10* (2013.01);
(Continued)

(58) Field of Classification Search
None
See application file for complete search history.

(56) References Cited

U.S. PATENT DOCUMENTS

| | | | |
|---|---|---|---|
| 9,035,976 | B2 | 5/2015 | Lee et al. |
| 9,418,590 | B2 | 8/2016 | Park et al. |
| 9,922,598 | B2 | 3/2018 | Park et al. |

(Continued)

FOREIGN PATENT DOCUMENTS

| | | | |
|---|---|---|---|
| KR | 1020150018966 | A | 2/2015 |
| KR | 101528148 | B1 | 6/2015 |

(Continued)

*Primary Examiner* — Ifedayo B Iluyomade
(74) *Attorney, Agent, or Firm* — CANTOR COLBURN LLP

(57) ABSTRACT

A display device includes: a pixel component including pixels; and a timing controller which controls the pixel component. The timing controller includes: a first look-up table which stores initial sensing data generated by sensing characteristics of the pixels at a first time point, and stores degradation sensing data generated by sensing characteristics of the pixels at a second time point; a second look-up table which stores initial sensing data of an anomalous pixel having a value difference equal to or greater than an initial threshold value from initial sensing data of peripheral pixels, and stores degradation sensing data of the anomalous pixel; an optical look-up table which stores optical data, based on which optical compensation of the pixels is performed; and an optical compensator which updates the optical data with reference to the first and second look-up tables to compensate for degradation of the anomalous pixel.

21 Claims, 12 Drawing Sheets

(52) U.S. Cl.
CPC ... *G09G 2360/144* (2013.01); *G09G 2360/16* (2013.01)

(56) References Cited

U.S. PATENT DOCUMENTS

| | | | | | |
|---|---|---|---|---|---|
| 10,741,114 | B2 | 8/2020 | Park | | |
| 11,657,769 | B1 | 5/2023 | Jang et al. | | |
| 11,798,496 | B2 | 10/2023 | Lim et al. | | |
| 11,972,719 | B2 | 4/2024 | Yang et al. | | |
| 2014/0300937 | A1* | 10/2014 | Choe | H04N 1/0282 | 358/480 |
| 2015/0042697 | A1* | 2/2015 | Park | G09G 3/2092 | 345/77 |

FOREIGN PATENT DOCUMENTS

| | | | |
|---|---|---|---|
| KR | 102013701 | B1 | 8/2019 |
| KR | 102160815 | B1 | 9/2020 |
| KR | 102166448 | B1 | 10/2020 |
| KR | 102322708 | B1 | 11/2021 |
| KR | 102435096 | B1 | 8/2022 |
| KR | 1020230046483 | A | 4/2023 |
| KR | 1020230056852 | A | 4/2023 |
| KR | 1020230073061 | A | 5/2023 |

* cited by examiner

DISPLAY DEVICE AND METHOD OF DRIVING THE SAME, AND ELECTRONIC DEVICE INCLUDING DISPLAY DEVICE

The application claims priority to Korean Patent Application No. 10-2024-0030847, filed on Mar. 4, 2024, and all the benefits accruing therefrom under 35 U.S.C. § 119, the content of which in its entirety is herein incorporated by reference.

BACKGROUND

(1) Field

Various embodiments of the disclosure relate to a display device, a method of driving the display device, and an electronic device including the display device.

(2) Description of the Related Art

Display devices may display images using pixels connected to a plurality of scan lines and a plurality of data lines. In such display devices, each of the pixels may include a light emitting element and a driving transistor.

The driving transistor may control the amount of current to be supplied to the light emitting element in response to a data signal supplied thereto through the data line. The light emitting element may generate light having a certain luminance corresponding to the amount of current supplied from the driving transistor.

SUMMARY

To enable a display device to display an image having uniform image quality, it may be desired for the driving transistor in each of the pixels to supply uniform current to the light emitting element in response to a data signal. Furthermore, to enable the display device to display an image having uniform image quality, it may be desired for the light emitting element included in each of the pixels to generate light of a uniform luminance in response to driving current.

However, the driving transistor and the light emitting element that are included in each of the pixels may degrade depending on usage time, display grayscale values, or the like, thus potentially leading to generation of light with non-uniform luminance from the pixel.

Various embodiments of the disclosure are directed to a display device configured to sense current flowing through pixels and generate sensing data (e.g., external compensation) so that degradation of a driving transistor and/or light emitting element included in each of the pixels can be compensated for using the sensing data.

Various embodiments of the disclosure are directed to a display device capable of compensating for degradation of an anomalous pixel using initial sensing data and degradation sensing data.

Various embodiments of the disclosure are directed to a method of driving the display device, and an electronic device including the display device.

An embodiment of the disclosure provides a display device, including: a pixel component including pixels; and a timing controller which controls the pixel component. In such an embodiment, the timing controller includes: a first look-up table which stores pieces of initial sensing data generated by sensing characteristics of the pixels at a first time point, and stores pieces of degradation sensing data generated by sensing characteristics of the pixels at a second time point; a second look-up table which stores initial sensing data of an anomalous pixel having a value difference equal to or greater than an initial threshold value from pieces of initial sensing data of peripheral pixels among the pieces of initial sensing data, and stores degradation sensing data of the anomalous pixel; an optical look-up table which stores pieces of optical data, based on which optical compensation of the pixels is performed; and an optical compensator which updates the pieces of optical data with reference to the first look-up table and the second look-up table to compensate for degradation of the anomalous pixel.

In an embodiment, the display device may further include a sensing driver which senses the pieces of initial sensing data based on sensing current supplied from the pixels at the first time point, and sense the pieces of degradation sensing data based on the sensing current supplied from the pixels at the second time point.

In an embodiment, the first time point may be a specific time point during a fabrication process, and the second time point may be a specific time point after the display device is shipped out.

In an embodiment, the timing controller may further include a sensing compensator which stores the initial sensing data and the degradation sensing data in the first look-up table, and stores the pieces of initial sensing data of the anomalous pixel and the pieces of degradation sensing data of the anomalous pixel in the second look-up table.

In an embodiment, the pieces of initial sensing data include initial substitution data obtained by changing the initial sensing data of the anomalous pixel to an average value of the pieces of initial sensing data of the peripheral pixels. In such an embodiment, the pieces of degradation sensing data may include degradation substitution data obtained by changing the degradation sensing data of the anomalous pixel to an average value of the degradation sensing data of the peripheral pixels.

In an embodiment, the optical compensator may update the optical data corresponding to the anomalous pixel using the initial sensing data of the anomalous pixel, the degradation sensing data of the anomalous pixel, the initial substitution data of the anomalous pixel and the degradation sensing data of the anomalous pixel.

In an embodiment, the optical compensator may determine an actual degradation value of the anomalous pixel using the initial sensing data of the anomalous pixel and the degradation sensing data of the anomalous pixel. The optical compensator may determine a degradation compensation value of the anomalous pixel using the initial substitution data of the anomalous pixel and the degradation substitution data of the anomalous pixel.

In an embodiment, the optical compensator may change the optical data corresponding to the anomalous pixel when a value obtained by subtracting the degradation compensation value from the actual degradation value is equal to or greater than a preset degradation threshold value.

In an embodiment, the timing controller may further include a controller which generates output data using input data from an external device. In such an embodiment, the controller may include an output data generator which receives, the input data, a first offset supplied from the sensing compensator based on the first look-up table and a second offset supplied from the optical compensator based on the optical look-up table, and generates the output data based on the input data, the first offset and the second offset.

In an embodiment, the controller may further include a grayscale determination component which receives the first offset and the second offset and determines whether compensation for degradation of the anomalous pixel within a maximum grayscale value is feasible, and increases a luminance of the peripheral pixels when determined that the compensation is not feasible.

In an embodiment, the peripheral pixels may emit light of a color identical to the anomalous pixel, and may be positioned adjacent to the anomalous pixel.

In an embodiment, the peripheral pixels may emit light of colors different from the anomalous pixel, and be positioned adjacent to the anomalous pixel.

An embodiment of the disclosure provides a method of driving a display device, including: determining an anomalous pixel using pieces of initial sensing data, which are sensed from pixels at a first time point, and generating initial substitution data by substituting anomalous-pixel-initial sensing data corresponding to the anomalous pixel with another value; generating pieces of optical data corresponding to optical compensation for the pixels; generating degradation substitution data by substituting anomalous-pixel-degradation sensing data corresponding to the anomalous pixel among pieces of degradation sensing data, which are sensed from the pixels at a second time point, with another value; and changing optical data corresponding to the anomalous pixel using the initial substitution data, the anomalous-pixel-initial sensing data, the degradation substitution data, and the anomalous-pixel-degradation sensing data.

In an embodiment, the first time point may be a specific time point during a process of fabricating the display device, and the second time point may be a specific time point after the display device is shipped out.

In an embodiment, the initial sensing data of the anomalous pixel may differ from the initial sensing data of peripheral pixels by a value difference equal to or greater than a threshold value.

In an embodiment, the initial substitution data may be generated by averaging the pieces of initial sensing data of peripheral pixels of the anomalous pixel.

In an embodiment, the degradation substitution data may be generated by averaging the pieces of degradation sensing data of peripheral pixels of the anomalous pixel.

In an embodiment, the method may further include: determining an actual degradation value of the anomalous pixel using the anomalous-pixel-initial sensing data and the anomalous-pixel-degradation sensing data; determining a degradation compensation value of the anomalous pixel using the initial substitution data and the degradation substitution data; and changing the optical data corresponding to the anomalous pixel when a value obtained by subtracting the degradation compensation value from the actual degradation value is equal to or greater than a preset degradation threshold value.

In an embodiment, the method may further include: generating a first offset using the pieces of initial sensing data, the initial substitution data, the pieces of degradation sensing data, and the degradation substitution data; generating a second offset using the pieces of optical data; and generating output data by reflecting the first offset and the second offset in input data.

In an embodiment, the method may further include receiving the first offset and the second offset and determining whether compensation for degradation of the anomalous pixel is feasible, and increasing a luminance of peripheral pixels positioned around the anomalous pixel when determined that the compensation is not feasible.

An embodiment of the disclosure provides an electronic device including: a first look-up table which stores pieces of initial sensing data including initial characteristics of pixels, and pieces of degradation sensing data including degradation characteristics of the pixels; a second look-up table which stores initial sensing data of an anomalous pixel having abnormal luminance characteristics among the pixels, and degradation sensing data of the anomalous pixel; an optical look-up table which stores pieces of optical data corresponding to optical characteristics of the pixels; and a controller which generates output data based on data stored in the first look-up table, the second look-up table, and the optical look-up table. In such an embodiment, the controller changes optical data corresponding to the anomalous pixel based on data stored in the first look-up table and the second look-up table in a way such that degradation of the anomalous pixel is compensated for.

DETAILED DESCRIPTION

Figure 1:
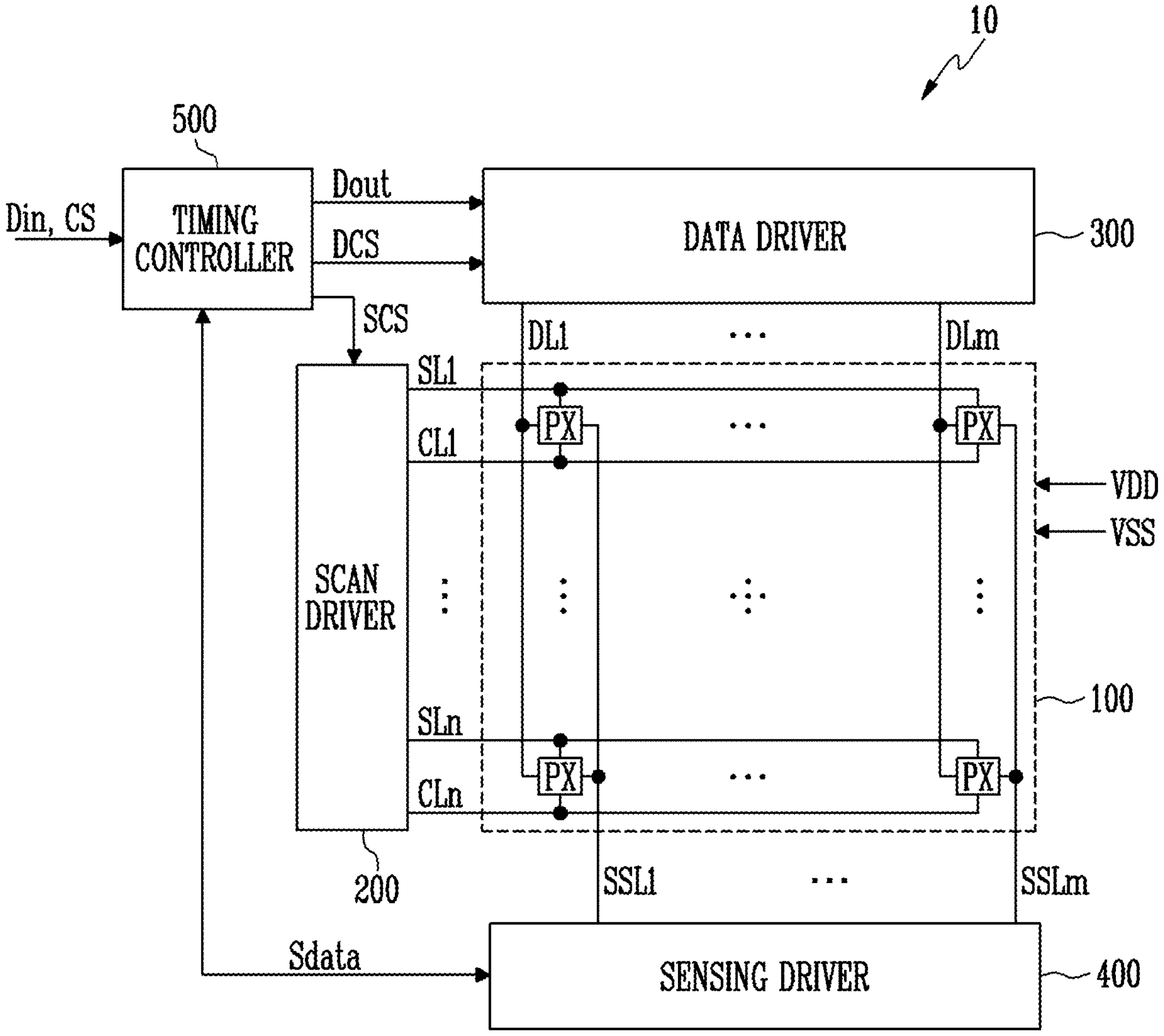
FIG. 1 is a diagram illustrating a display device in accordance with an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

In the drawings, portions which are not related to the disclosure will be omitted in order to explain the disclosure more clearly. Reference should be made to the drawings, in which similar reference numerals are used throughout the different drawings to designate similar components. Therefore, the aforementioned reference numerals may be used in other drawings.

Furthermore, the expression "being the same" may mean "being substantially the same". In other words, the expression "being the same" may include a range that can be tolerated by those skilled in the art. The other expressions may also be expressions from which the term "substantially" has been omitted.

Some embodiments are described in the accompanying drawings in connection with functional blocks, units and/or modules. Those skilled in the art will understand that such blocks, units, and/or modules are physically implemented by logic circuits, discrete components, microprocessors, hard-wired circuits, memory elements, line connections, and other electronic circuits. This may be formed using semiconductor-based fabrication techniques or other fabrication techniques. For blocks, units, and/or modules implemented by a microprocessor or other similar hardware, they may be programmed and controlled using software to perform various functions discussed herein, and may be optionally driven by firmware and/or software. In addition, each block, unit, and/or module may be implemented by dedicated hardware, or be implemented by a combination of the dedicated hardware which performs some functions and a processor which performs different functions (e.g. one or more programmed microprocessors and related circuits). Furthermore, in some embodiments, blocks, units and/or modules may be physically separated into two or more individual blocks, units and/or modules which interact with each other without departing from the scope of the inventive concept. In some embodiments, blocks, units and/or modules may be physically combined into more complex blocks, units and/or modules without departing from the scope of the inventive concept.

The term "connection" between two components may embrace electrical connection and physical connection, but the disclosure is not limited thereto. For example, the term "connection" used in description with reference to a circuit diagram may refer to electrical connection, and the term "connection" used in description with reference to a sectional view or a plan view may refer to physical connection.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the disclosure.

It will be understood that when an element is referred to as being "on" another element, it can be directly on the other element or intervening elements may be present therebetween. In contrast, when an element is referred to as being "directly on" another element, there are no intervening elements present.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

However, the disclosure is not limited to the following embodiments and may be modified into various forms. Each embodiment to be described below may be implemented alone, or combined with at least another embodiment to make various combinations of embodiments.

FIG. 1 is a diagram illustrating a display device 10 in accordance with an embodiment of the disclosure.

Referring to FIG. 1, the display device 10 in accordance with an embodiment of the disclosure may include a pixel component 100 (or a display panel), a scan driver 200, a data driver 300, a sensing driver 400, and a timing controller 500.

The configuration of the foregoing functional components pertaining to, for example, whether to integrate the foregoing functional components on a single integrated circuit (IC) or a plurality of ICs or whether to mount the functional components on a display substrate, may be changed in various ways depending on the specifications of the display device 10. For example, at least some functions of the timing controller 500, the data driver 300, and the sensing driver 400 may be integrated into a single IC.

The display device 10 may be a flat display device, a flexible display device, a curved display device, a foldable display device, or a bendable display device. Furthermore, the display device 100 may be applied to a transparent display device, a head-mounted display device, a wearable display device, or the like. Furthermore, the display device 10 may be applied to various electronic devices such as a smartphone, a tablet computer, a smart pad, a television (TV), and a monitor.

In an embodiment, an operation period of the display device 10 may be divided into a display period provided to display an image, and a sensing period provided to sense characteristics of a driving transistor and/or a light emitting element included in each of the pixels PX.

The pixel component 100 may include pixels PX positioned to be connected to data lines DL1 to DLm, scan lines SL1 to SLn, control lines CL1 to CLn, and sensing lines SSL1 to SSLm (where n and m are each a natural number of 2 or greater). The pixels PX may be supplied with a first driving voltage VDD and a second driving voltage VSS from an external device. During a period in which the pixels PX are set to an emission state, the first driving voltage VDD may be set to a voltage higher than that of the second driving voltage VSS.

In an embodiment, the transistors included in the pixel PX may be N-type oxide thin-film transistors. In an embodiment, for example, an oxide thin-film transistor may be a low-temperature polycrystalline oxide (LTPO) thin-film transistor. However, this is only an example, and the N-type transistors are not limited thereto. For example, an active pattern (or a semiconductor layer) included in each transistor may include an inorganic semiconductor (e.g., amorphous silicon, poly silicon) and/or an organic semiconductor. Furthermore, at least one of the transistors included in the display device 10 may be replaced with a P-type transistor.

The timing controller 500 may receive input data Din and a control signal CS corresponding to each frame from an external processor. Here, the processor may include at least one selected from a graphics processing unit (GPU), a central processing unit (CPU), an application processor (AP), and the like.

The timing controller 500 may correct the input data Din and generate output data Dout, and supply the generated output data Dout to the data driver 300. In an embodiment, for example, the timing controller 500 may use sensing data Sdata, optical data, or the like to correct the input data Din. Here, the sensing data Sdata may include degradation information of the pixels PX (e.g., degradation information of the driving transistor and/or light emitting element) sensed from the sensing driver 400. The optical data may include luminance information of the pixels measured during a fabrication process.

The timing controller 500 may generate a data driving signal DCS and a scan driving signal SCS in response to the control signal CS. The data driving signal DCS may be supplied to the data driver 300. The scan driving signal SCS may be supplied to the scan driver 200.

The data driving signal DCS may include a source start signal and clock signals. The source start signal may control a data sampling start time point. The clock signals may be used to control a sampling operation.

The scan driving signal SCS may include a scan start signal, a control start signal, and clock signals. The scan start signal may control a timing of an enable scan signal, that is, a scan signal having an enabled level (e.g., an active level or a turn-on level). The control start signal may control a timing of an enable control signal, that is, a control signal having an enabled level (e.g., an active level or a turn-on level). The clock signals may be used to shift the scan start signal and/or the control start signal.

The timing controller 500 may further control the operation of the sensing driver 400. In an embodiment, for example, the timing controller 500 may control a timing at which an initialization voltage is supplied to the pixels PX through the sensing lines SSL1 to SSLm, and/or a timing at which current is sensed from the pixels PX through the sensing lines SSL1 to SSLm.

In an embodiment, for example, the timing controller 500 may control the sensing driver 400 to supply the initialization voltage to the sensing lines SSL1 to SSLm during the display period. In an embodiment, for example, the timing controller 500 may control the sensing driver 400 to sense sensing current from each pixel PX connected to at least one of the sensing lines SSL1 to SSLm during the sensing period. The sensing driver 400 may generate sensing data Sdata in response to the sensing current.

The scan driver 200 may receive a scan driving signal SCS from the timing controller 500. The scan driver 200 may supply enable scan signals to the scan lines SL1 to SLn in response to the scan driving signal SCS, and supply enable control signals to the control lines CL1 to CLn.

In an embodiment, for example, the scan driver 200 may sequentially supply enable scan signals to the scan lines SL1 to SLn during the display period (and sensing period). In such an embodiment, where the enable scan signals are sequentially supplied to the scan lines SL1 to SLn, the pixels PX may be selected on a horizontal line basis. In such an embodiment, the enable scan signals may be set to a gate-on voltage (e.g., a logic high level) so that the transistors included in the pixels PX may be turned on.

In an embodiment, for example, the scan driver 200 may sequentially supply enable control signals to the control lines CL1 to CLn during the display period. In such an embodiment where the enable control signals are sequentially supplied, the pixels PX may be selected on a horizontal line basis, and the initialization voltage may be supplied to the selected pixels PX. In such an embodiment, the enable control signals may be set to a gate-on voltage (e.g., a logic high level) so that the transistors included in the pixels PX may be turned on.

The scan driver 200 may supply an enable control signal to at least one of the control lines CL1 to CLn during the sensing period. During the sensing period, current may be sensed from the pixel PX supplied with the enable control signal. Degradation information of the driving transistor and/or light emitting element included in the pixel PX may be included in the current sensed from the pixel PX. In an embodiment, for example, the degradation information of the driving transistor may include threshold voltage and/or mobility information.

Although FIG. 1 illustrate an embodiment where one scan driver 200 outputs both the enable scan signal and the enable control signal, the embodiments of the disclosure are not limited thereto. In another embodiment, for example, the scan driver 200 may include a first scan driver configured to supply the enable scan signal to the pixel component 100, and a second scan driver configured to supply the enable control signal to the second scan driver.

The data driver 300 may be supplied with the data control signal DCS from the timing controller 500. During the display period, the data driver 300 may generate data signals for image display based on the output data Dout, and supply the generated data signals to the pixel component 100 through the data lines DL1 to DLm. During the sensing period, the data driver 300 may supply a reference voltage for detecting characteristics of the pixel PX to the pixel component 100 via the data lines DL1 to DLm.

During the display period, the sensing driver 400 may supply the initialization voltage to the pixels PX selected by the enable control signal. During the sensing period, the sensing driver 400 may generate sensing data Sdata corresponding to characteristic values of the pixels PX based on the sensing current (or sensing voltage) provided from at least one of the sensing lines SSL1 to SSLm. The characteristic values of the pixels PX may include degradation information of the driving transistor and/or light emitting element included in each of the pixels PX.

The sensing data Sdata generated from the sensing driver 400 may be supplied to the timing controller 500. The timing controller 500 may produce or generate an offset to compensate for the degradation of the pixels PX in correspondence with the sensing data Sdata, and reflect the produced offset in the input data Din.

Figure 2:
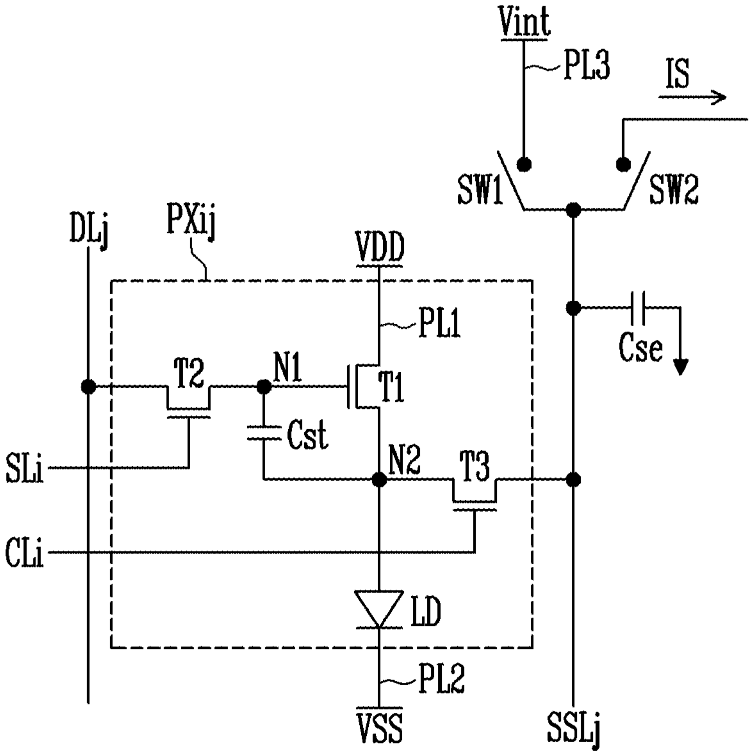
FIG. 2 is a diagram illustrating an embodiment of a pixel illustrated in FIG. 1.

FIG. 2 is a diagram illustrating an embodiment of a pixel illustrated in FIG. 1. In FIG. 2, for convenience of illustration and description, a pixel PXij positioned on an i-th horizontal line and a j-th vertical line is shown.

Referring to FIG. 2, an embodiment of the pixel PXij may include a light emitting element LD, and a pixel circuit configured to drive the light emitting element LD.

The light emitting element LD may include a first electrode (e.g., an anode electrode) connected, via a second node N2 and a first transistor T1, to a first power line PL1 that receives the first driving voltage VDD, and a second electrode (e.g., a cathode electrode) connected to a second power line PL2 that receives the second driving voltage VSS. The light emitting element LD may be a light emitting diode. The light emitting element LD may be formed of an organic light emitting diode, an inorganic light emitting diode, a quantum dot/well light emitting diode, or the like.

Although FIG. 2 illustrate an embodiment in which the pixel PXij includes one light emitting element LD, the disclosure is not limited thereto. In another embodiment, for example, the pixel PXij may include a plurality of light emitting elements LD. Here, the plurality of light emitting elements may be connected to each other in series, parallel, series-parallel, or the like.

The pixel circuit may include a first transistor (or driving transistor) T1, a second transistor T2, a third transistor T3, and a storage capacitor Cst.

The first transistor T1 may include a first electrode connected to the first power line PL1, and a second electrode connected to the second node N2 (i.e., the first electrode of the light emitting element LD). A gate electrode of the first transistor T1 may be connected to a first node N1. The first transistor T1 may control the amount of current flowing to the light emitting element LD in response to the voltage of the first node N1.

The second transistor T2 may include a first electrode connected to the data line DLj, and a second electrode connected to the first node N1. A gate electrode of the second transistor T2 may be connected to an i-th scan line SLi (hereinafter, referred to as a scan line SLi, where i is a natural number of n or less). When an enable scan signal is supplied to the scan line SLi, the second transistor T2 may be turned on to transmit a data signal from a j-th data line DLj (hereinafter, referred to as a data line DLj, where j is a natural number of m or less) to the first node N1.

The third transistor T3 may be connected between a j-th sensing line SSLj (hereinafter, referred to as a sensing line SSLj) and the second node N2. A gate electrode of the third transistor T3 may be connected to an i-th control line CLi (hereinafter, referred to as a control line CLi). When an enable control signal is supplied to the control line CLi, the third transistor T3 may be turned on to electrically connect the sensing line SSLj and the second node N2 (i.e., the second electrode of the first transistor T1) to each other.

The storage capacitor Cst may be connected between the first node N1 and the second node N2. The storage capacitor Cst may store a voltage corresponding to a difference in voltage between the first node N1 and the second node N2.

A first switch SW1 and a second switch SW2 may be connected to the sensing line SSLj. The first switch SW1 and the second switch SW2 may be turned on alternately with each other. When the first switch SW1 is turned on, an initialization voltage Vint may be supplied from the third power line PL3 to the sensing line SSLj. When the second switch SW2 is turned on, sensing current IS of the pixel PXij may be supplied to the sensing driver 400. The first switch SW1 and the second switch SW2 may be integrated into the display panel in which the pixel component 100 is disposed, or may be included in the sensing driver 400.

Although FIG. 2 illustrates an embodiment where each of the transistors T1 to T3 is an N-channel metal oxide semiconductor (NMOS) transistor, the disclosure is not limited thereto. In another embodiment, for example, at least one of the transistors T1 to T3 may be a P-channel metal oxide semiconductor (PMOS) transistor.

Figure 3:
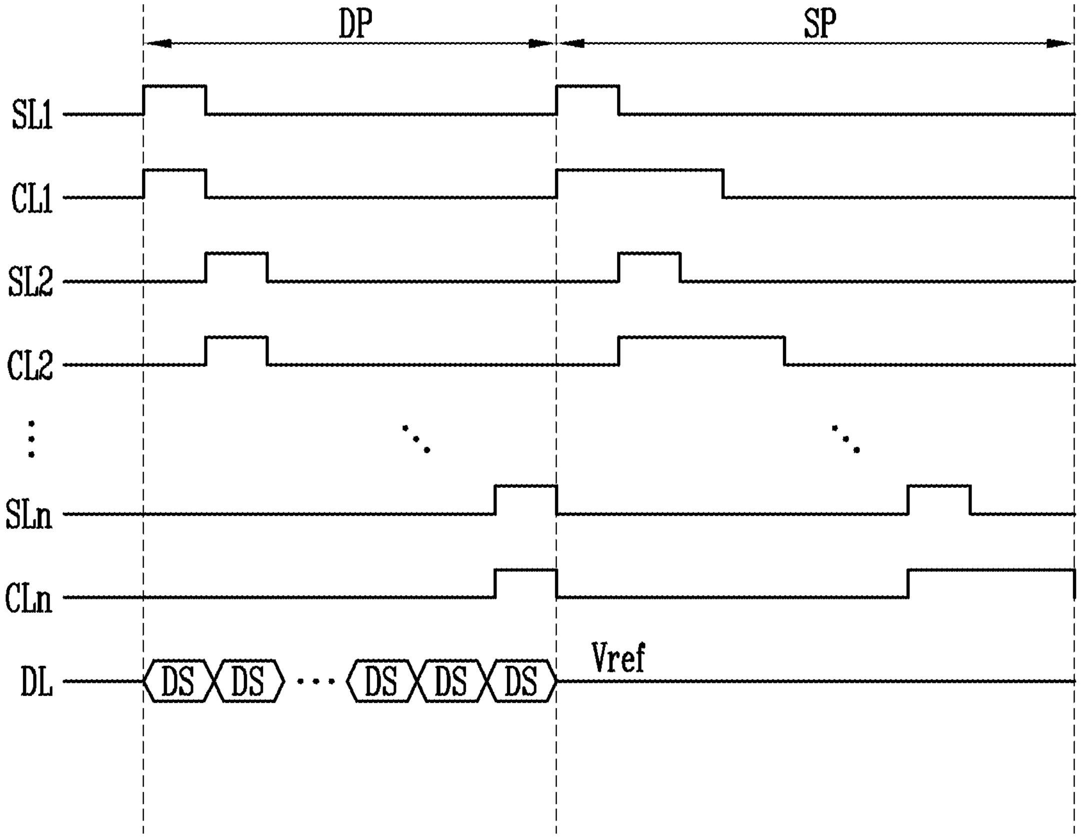
FIG. 3 is a waveform diagram illustrating a method of driving the pixel in accordance with an embodiment of the disclosure.

FIG. 3 is a waveform diagram illustrating a method of driving the pixel in accordance with an embodiment of the disclosure.

Referring to FIG. 3, the operation period of the display device 10 may be divided into a display period DP provided to display an image (i.e., during which the image is displayed), and a sensing period SP provided to sense characteristics (e.g., degradation) of the pixel PX.

During the display period DP, the first switch SW1 of the pixel PXij may be turned on, and the second switch SW2 may be set to a turn-off state. Therefore, the initialization power Vint that is a constant voltage may be supplied to the sensing line SSLj.

During the display period DP, the scan driver 200 may sequentially supply enable scan signals to the scan lines SL1 to SLn. Furthermore, during the display period DP, the scan driver 200 may sequentially supply enable control signals to the control lines CL1 to CLn. With regard to the i-th horizontal line, a scan signal and a control signal may be substantially simultaneously supplied. Hence, the second transistor T2 and the third transistor T3 may be simultaneously turned on or turned off.

When the second transistor T2 is turned on, a data signal DS corresponding to image data may be supplied to the first node N1. When the third transistor T3 is turned on, the initialization voltage Vint may be supplied to the second node N2. Therefore, the storage capacitor Cst may store a voltage corresponding to a difference in voltage between the data signal DS and the initialization voltage Vint. Here, because the initialization voltage Vint is set to a constant voltage, the voltage stored in the storage capacitor Cst may be determined by the data signal DS.

When the supply of the scan signal and the enable control signal to the scan line SLi and the control line CLi is interrupted, the second transistor T2 and the third transistor T3 may be turned off.

Thereafter, the first transistor T1 may control the amount of current (driving current) to be supplied to the light emitting element LD in response to the voltage stored in the storage capacitor Cst. Hence, the light emitting element LD may emit light at a luminance corresponding to the driving current of the first transistor T1.

In an embodiment, during the sensing period SP, the scan driver 200 may sequentially supply enable scan signals to the scan lines SL1 to SLn. In such an embodiment, during the sensing period SP, the scan driver 200 may sequentially supply enable control signals to the control lines CL1 to CLn.

In an embodiment, a length of the enable control signal supplied during the sensing period SP may be greater than that of the enable control signal supplied during the display period DP. In addition, during the sensing period SP, a portion of the enable control signal supplied to the control line CLi may overlap the enable scan signal supplied to the scan line SLi.

In an embodiment, the length of the enable control signal may be greater than that of the enable scan signal during the display period DP. In an embodiment, for example, during the display period DP, a time point at which the enable control signal starts to be supplied to the control line CLi is the same as a time point at which the enable scan signal starts to be supplied to the scan line SLi, and a period of the supply of the enable control signal may be longer than that of the enable scan signal.

When the enable scan signal and the enable control signal are simultaneously supplied, the second and third transistors T2 and T3 may be turned on. Here, the first switch SW1 may be in a turn-on state. When the second transistor T2 is turned on, a reference voltage Vref for sensing may be supplied to the first node N1 through the data line DLj. At the same time, the initialization voltage Vint may be supplied to the second node N2 by turning on the third transistor T3. Hence, a voltage corresponding to a difference in voltage between the reference voltage Vref and the initialization voltage Vint may be stored in the storage capacitor Cst.

Subsequently, when the supply of the enable scan signal is interrupted, the second transistor T2 may be turned off. The first switch SW1 may be turned off. When the first switch SW1 is turned off, the voltage of the second node N2 increases, and sensing current IS is generated through the first transistor T1. While the voltage increases, the sensing current IS may flow to the sensing line SSLj, such that a sensing capacitor Cse may be charged. A rate at which the voltage increases may vary depending on the current capability (i.e., the mobility) of the first transistor T1.

After the voltage increase is performed for a preset time, the second switch SW2 may be turned on such that the sensing line SSLj can be connected to the sensing driver 400. In an embodiment, for example, an analog-to-digital converter included in the sensing driver 400 may generate sensing data Sdata based on the voltage charged in the sensing capacitor Cse (i.e., the voltage corresponding to the sensing current IS).

The sensing period SP may be performed at each certain time point during actual use of the display device 10. In an embodiment, for example, the sensing period SP may be disposed at a part of the time at which the display device 10 is turned on and/or turned off.

However, the embodiments described above are merely examples, and the sensing period SP may be inserted or provided between display periods DP. Therefore, sensing data Sdata (i.e., degradation information) of the pixels PX included in the pixel component 100 may be continuously supplied to the timing controller 500.

Figure 4:
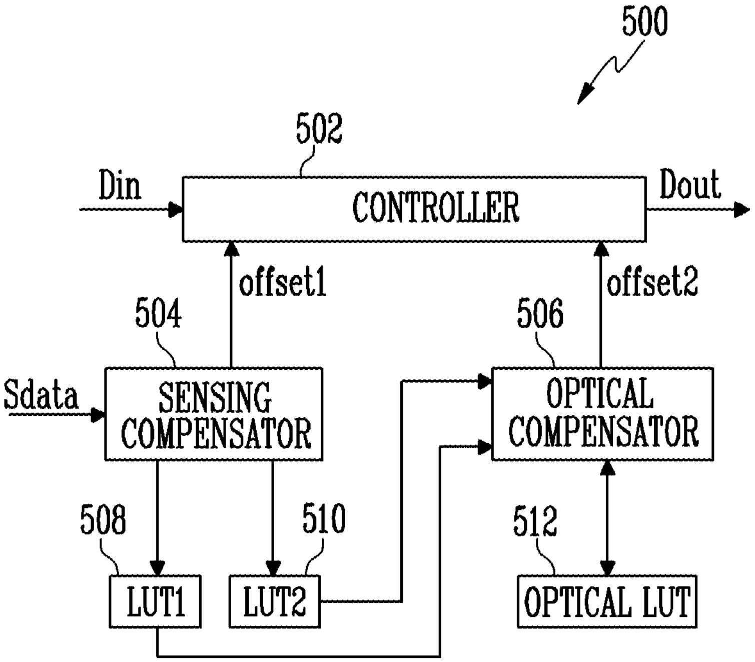
FIG. 4 is a diagram illustrating a timing controller in accordance with an embodiment of the disclosure.
Figure 5:
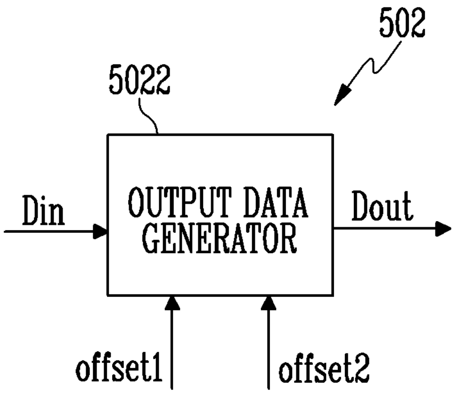
FIG. 5 is a diagram illustrating an embodiment of a controller illustrated in FIG. 4.

FIG. 4 is a diagram illustrating the timing controller 500 in accordance with an embodiment of the disclosure. FIG. 5 is a diagram illustrating an embodiment of a controller illustrated in FIG. 4. In FIG. 4, only components among various components included in the timing controller 500 are shown for convenience of illustration and description.

Referring to FIG. 4, the timing controller 500 in accordance with an embodiment of the disclosure may include a controller 502, a sensing compensator 504, an optical compensator 506, and look-up tables (hereinafter referred to as "LUTs") 508, 510, and 512. The LUTs 508, 510, and 512 may include a first LUT (LUT1) 508, a second LUT (LUT2) 510, and an optical LUT 512. The LUTs 508, 510, and 512 may be stored in a memory that is not shown.

Sensing data Sdata may be stored in the first LUT 508. In an embodiment, for example, initial sensing data and degradation sensing data may be stored in the first LUT 508. The initial sensing data may refer to sensing data Sdata sensed from the pixels PX during a fabrication process (or at a first time point). The sensing data Sdata sensed during the fabrication process may be processed in the sensing compensator 504 and then stored in the first LUT 508. The initial sensing data may include initial characteristic information of the driving transistor and/or the light emitting element included in each of the pixels PX.

The degradation sensing data may refer to sensing data Sdata sensed in the sensing driver 400 during a sensing period SP (or at a second time point) after the display device 10 is shipped out. The sensing data Sdata sensed during the sensing period SP may be processed in the sensing compensator 504 and then stored in the first LUT 508. The degradation sensing data may include degradation information of the driving transistor and/or the light emitting element included in each of the pixels PX.

Initial sensing data and degradation sensing data corresponding to at least one anomalous pixel may be stored in the second LUT 510. The anomalous pixel may refer to a pixel having different characteristics from adjacent peripheral pixels. For example, in the case where the sensing data Sdata of a specific pixel has a difference value equal to or greater than a threshold value compared to the sensing data Sdata of peripheral pixels, the specific pixel may be set to an anomalous pixel. For example, the anomalous pixel may be a defective pixel.

The sensing compensator 504 may be supplied with sensing data Sdata from the sensing driver 400. In the case where the sensing data Sdata is inputted at the first time point, the sensing compensator 504 may determine an anomalous pixel using a preset initial threshold value. The sensing compensator 504 may store sensing data corresponding to the anomalous pixel in the second LUT 510 as anomalous-pixel-initial sensing data. Furthermore, the sensing compensator 504 may substitute an average value of sensing data of the peripheral pixels adjacent to the anomalous pixel with sensing data (or initial substitution data) of the anomalous pixel. The initial substitution data and the sensing data of the peripheral pixels may be stored in the first LUT 508 as initial sensing data.

In the case where the sensing data Sdata is inputted at the second time point, the sensing compensator 504 may determine an anomalous pixel using a preset degradation threshold value. However, the embodiments of the disclosure are not limited thereto. The sensing compensator 504 may use the information of the anomalous pixel determined at the first time point rather than determining the anomalous pixel at the second time point. The initial threshold value and the degradation threshold value may be set to a same value or different values, respectively.

The sensing compensator 504 may store sensing data corresponding to the anomalous pixel in the second LUT 510 as anomalous-pixel-degradation sensing data. Furthermore, the sensing compensator 504 may substitute an average value of sensing data of the peripheral pixels adjacent to the anomalous pixel with sensing data (or degradation substitution data) of the anomalous pixel. The degradation substitution data and the sensing data of the peripheral pixels may be stored in the first LUT 508 as degradation sensing data.

The sensing compensator 504 may generate a first offset offset1 such that degradation of the pixels PX can be compensated for using the initial sensing data and the degradation sensing data, and may supply the first offset offset1 to the controller 502.

Optical data may be stored in the optical LUT 512. The optical data may be stored during the fabrication process. In an embodiment, for example, during the fabrication process, the luminance of the pixels PX may be measured while data signals having various grayscale values are supplied to the pixels PX, and the optical data may be generated in a way that the luminance of the pixels PX can be uniform (e.g., optical compensation).

The optical compensator 506 may change (or update) the optical data stored in the optical LUT 512 using the initial substitution data and degradation substitution data stored in the first LUT 508, and the anomalous-pixel-initial sensing data and anomalous-pixel-degradation sensing data stored in the second LUT 510. In an embodiment, for example, the optical compensator 506 may change the optical data corresponding to the anomalous pixel in a way such that the degradation of the anomalous pixel can be compensated for.

The optical compensator 506 may generate a second offset offset2 using the optical data to enable the pixels PX to generate light of a uniform luminance, and may supply the second offset offset2 to the controller 502.

The controller 502 may include an output data generator 502, as illustrated in FIG. 5. The output data generator 502 may reflect the first offset offset1 and the second offset offset2 in input data Din and generate output data Dout. The output data Dout in which the first offset offset1 and the second offset offset2 are reflected may be set in a way such that the degradation of the pixels PX can be compensated for and, in addition, light of a uniform luminance can be generated.

Figure 6:
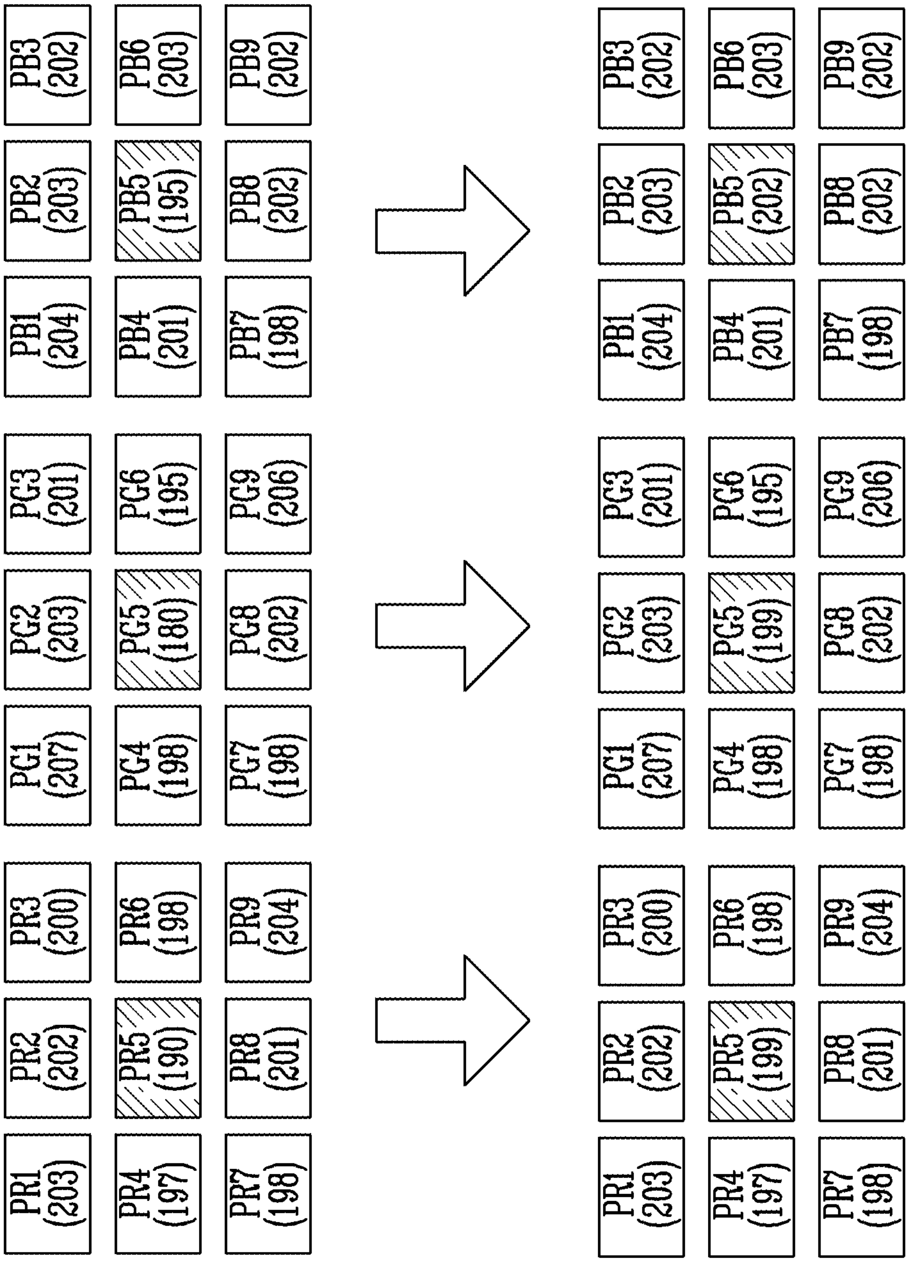
FIG. 6 is a diagram for describing initial sensing data and anomalous-pixel-initial sensing data.

FIG. 6 is a diagram for describing initial sensing data and anomalous-pixel-initial sensing data. In FIG. 6, it is assumed that one anomalous pixel is included in each sub-pixel (e.g., each of a red sub-pixel, a green sub-pixel, and a blue sub-pixel).

Referring to FIG. 6, during the fabrication process, the sensing period SP may be included to determine characteristics of each of the pixels PX. Initial sensing data sensed during the fabrication process may be supplied to the sensing compensator 504.

The sensing compensator 504 may determine whether the initial sensing data of each sub-pixel has a difference value equal to or greater than the initial threshold value from the initial sensing data of peripheral sub-pixels. In the case where the initial sensing data of a sub-pixel has a difference value equal to or greater than the initial threshold value, the sensing compensator 504 may determine that the sub-pixel is an anomalous pixel.

In an embodiment, the sensing compensator 504 may determine whether a difference value between initial sensing data of first sub-pixels (e.g., red sub-pixels) adjacent to each other is equal to or greater than a first threshold value. In the case where a specific first sub-pixel has a difference value equal to or greater than the first threshold value from peripheral first sub-pixels, it may be determined that the specific first sub-pixel is an anomalous pixel.

For example, in the case where initial sensing data of a specific first sub-pixel PR5 is set to 190 and initial sensing data of peripheral first sub-pixels PR1, PR2, PR3, PR4, PR6, PR7, PR8, and PR9 are respectively set to 203, 202, 200, 197, 198, 198, 201, and 204, it may be determined that the specific first sub-pixel PR5 is an anomalous pixel. The sensing compensator 504 may store the initial sensing data corresponding to the anomalous pixel PR5 in the second LUT 510 as anomalous-pixel-initial sensing data (i.e., 190).

The sensing compensator 504 may substitute an average value of the initial sensing data of the first sub-pixels positioned around the anomalous pixel PR5, for example, the first sub-pixels PR2, PR4, PR6, and PR8 positioned on upper, lower, left, and right sides of the anomalous pixel PR5, for the initial sensing data of the anomalous pixel PR5 (e.g., initial substitution data). The sensing compensator 504 may store the initial substitution data (e.g., 199) of the anomalous pixel PR5 and the initial sensing data of the peripheral first sub-pixels in the first LUT 508.

In an embodiment, the sensing compensator 504 may determine whether a difference value between initial sensing data of second sub-pixels (e.g., green sub-pixels) adjacent to each other is equal to or greater than a second threshold value. In the case where a specific second sub-pixel has a difference value equal to or greater than the second threshold value from peripheral second sub-pixels, it may be determined that the specific second sub-pixel is an anomalous pixel.

For example, in the case where initial sensing data of a specific second sub-pixel PG5 is set to 180 and initial sensing data of peripheral second sub-pixels PG1, PG2, PG3, PG4, PG6, PG7, PG8, and PG9 are respectively set to 207, 203, 201, 198, 195, 198, 202, and 206, it may be determined that the specific second sub-pixel PG5 is an anomalous pixel. The sensing compensator 504 may store the initial sensing data corresponding to the anomalous pixel PR5 in the second LUT 510 as anomalous-pixel-initial sensing data (i.e., 180).

The sensing compensator 504 may substitute an average value of the initial sensing data of the second sub-pixels positioned around the anomalous pixel PG5, for example, the second sub-pixels PG2, PG4, PG6, and PG8 positioned on upper, lower, left, and right sides of the anomalous pixel PG5, for the initial sensing data of the anomalous pixel PG5 (e.g., initial substitution data). The sensing compensator 504 may store the initial substitution data (e.g., 199) of the anomalous pixel PG5 and the initial sensing data of the peripheral second sub-pixels in the first LUT 508.

In an embodiment, the sensing compensator 504 may determine whether a difference value between initial sensing data of third sub-pixels (e.g., blue sub-pixels) adjacent to each other is equal to or greater than a third threshold value. In the case where a specific third sub-pixel has a difference value equal to or greater than the third threshold value from peripheral third sub-pixels, it may be determined that the specific third sub-pixel is an anomalous pixel.

For example, in the case where initial sensing data of a specific third sub-pixel PB5 is set to 195 and initial sensing data of peripheral third sub-pixels PB1, PB2, PB3, PB4, PB6, PB7, PB8, and PB9 are respectively set to 204, 203, 202, 201, 203, 198, 202, and 202, it may be determined that the specific third sub-pixel PB5 is an anomalous pixel. The sensing compensator 504 may store the initial sensing data corresponding to the anomalous pixel PB5 in the second LUT 510 as anomalous-pixel-initial sensing data (i.e., 195).

The sensing compensator 504 may substitute an average value of the initial sensing data of the third sub-pixels positioned around the anomalous pixel PB5, for example, the third sub-pixels PB2, PB4, PB6, and PB8 positioned on upper, lower, left, and right sides of the anomalous pixel PB5, for the initial sensing data of the anomalous pixel PB5 (e.g., initial substitution data). The sensing compensator 504 may store the initial substitution data (e.g., 202) of the anomalous pixel PB5 and the initial sensing data of the peripheral third sub-pixels in the first LUT 508.

Through the aforementioned process, during the fabrication process, the sensing compensator 504 may store the initial sensing data in the first LUT 508, and may store the anomalous-pixel-initial sensing data in the second LUT 510. The first threshold value, the second threshold value, and the third threshold value may be variously set based on the size, resolution, etc. of the panel. The first to third threshold values may be set to a same value or different values, respectively.

In an embodiment, as described above with reference to FIG. 6, an anomalous pixel may be determined in units of sub-pixels of a same color, but the embodiments of the disclosure are not limited thereto. In another embodiment, for example, an anomalous pixel is determined in units of physically adjacent sub-pixels regardless of the color of the sub-pixels. In such an embodiment, peripheral pixels of the anomalous pixel may be set to sub-pixels that emit light of different colors.

In an embodiment of the disclosure, an anomalous pixel is determined when the initial sensing data is stored in the first LUT 508, and the initial sensing data of the anomalous pixel may be changed to initial substitution data. Hence, the anomalous pixel may be effectively prevented from being overcompensated and/or undercompensated. Furthermore, additional information about the anomalous pixel may be stored in the first LUT 508.

In an embodiment, after the initial sensing data is stored in the first LUT 508, optical data may be stored in the optical LUT 512 through optical compensation. In such an embodiment, the optical data may be set to allow the pixels PX included in the pixel component 100 to emit light at a uniform luminance. In such an embodiment, after the display device 10 is shipped out, the pixel component 100 may display an image with a uniform luminance before the pixels PX are degraded.

Figure 7:
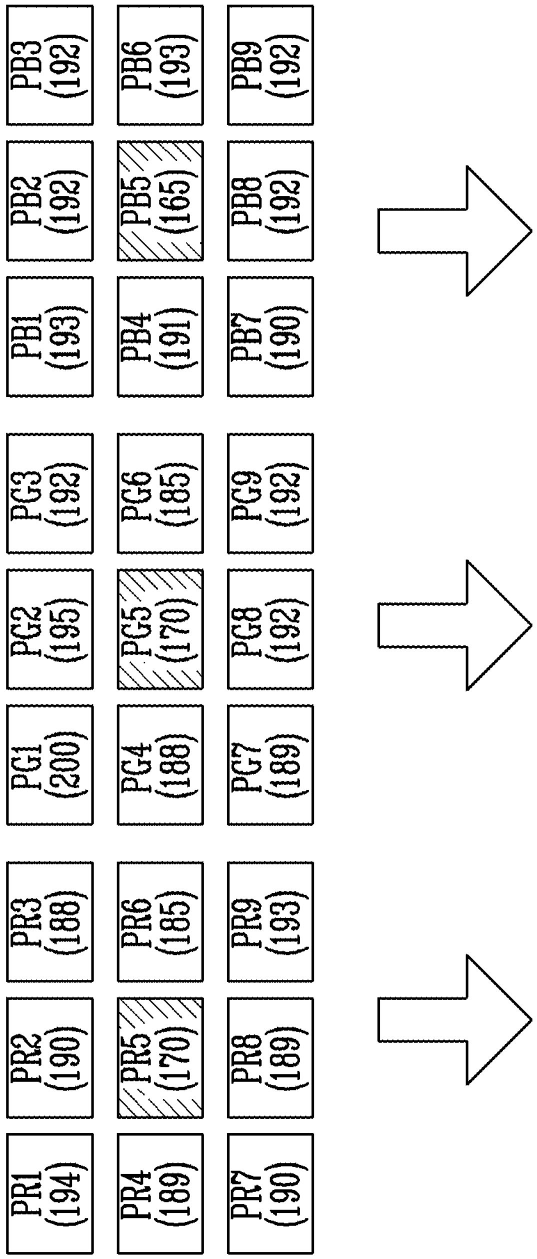
FIG. 7 is a diagram for describing degradation sensing data and anomalous-pixel-degradation sensing data.

FIG. 7 is a diagram for describing degradation sensing data and anomalous-pixel-degradation sensing data.

Referring to FIG. 7, after the display device 10 is shipped out, degradation sensing data may be supplied to the sensing compensator 504 during the sensing period SP (or at the second time point).

The sensing compensator 504 may determine whether the degradation sensing data of each sub-pixel has a difference value equal to or greater than the degradation threshold value from the degradation sensing data of peripheral sub-pixels. In the case where the degradation sensing data of a sub-pixel has a difference value equal to or greater than the degradation threshold value, the sensing compensator 504 may determine that the sub-pixel is an anomalous pixel. Here, the sensing compensator 504 may determine the anomalous pixel using information (i.e., information about the anomalous pixel) stored in the first LUT 508 rather than separately determining the anomalous pixel at the second time point.

Hereinafter, an embodiment of a method of determining the anomalous pixel using the degradation threshold value will be described. In an embodiment, the sensing compensator 504 may determine whether a difference value between degradation sensing data of first sub-pixels adjacent to each other is equal to or greater than a first threshold value. In the case where a specific first sub-pixel has a difference value equal to or greater than the first threshold value from peripheral first sub-pixels, it may be determined that the specific first sub-pixel is an anomalous pixel.

For example, in the case where degradation sensing data of a specific first sub-pixel PR5 is set to 170 and degradation sensing data of peripheral first sub-pixels PR1, PR2, PR3, PR4, PR6, PR7, PR8, and PR9 are respectively set to 194, 190, 188, 189, 185, 190, 189, and 193, it may be determined that the specific first sub-pixel PR5 is an anomalous pixel. The sensing compensator 504 may store the degradation sensing data corresponding to the anomalous pixel PR5 in the second LUT 510 as anomalous-pixel-degradation sensing data (i.e., 170).

The sensing compensator 504 may substitute an average value of the degradation sensing data of the first sub-pixels positioned around the anomalous pixel PR5, for example, the first sub-pixels PR2, PR4, PR6, and PR8 positioned on upper, lower, left, and right sides of the anomalous pixel PR5, for the degradation sensing data of the anomalous pixel PR5 (e.g., degradation substitution data). The sensing compensator 504 may store the degradation substitution data (e.g., 188) of the anomalous pixel PR5 and the degradation sensing data of the peripheral first sub-pixels in the first LUT 508.

In an embodiment, the sensing compensator 504 may determine whether a difference value between degradation sensing data of second sub-pixels (e.g., green sub-pixels) adjacent to each other is equal to or greater than a second threshold value. In the case where a specific second sub-pixel has a difference value equal to or greater than the second threshold value from peripheral second sub-pixels, it may be determined that the specific second sub-pixel is an anomalous pixel.

For example, in the case where degradation sensing data of a specific second sub-pixel PG5 is set to 170 and degradation sensing data of peripheral second sub-pixels PG1, PG2, PG3, PG4, PG6, PG7, PG8, and PG9 are respectively set to 200, 192, 188, 185, 195, 189, 192, and 192, it may be determined that the specific second sub-pixel PG5 is an anomalous pixel. The sensing compensator 504 may store the degradation sensing data corresponding to the anomalous pixel PG5 in the second LUT 510 as anomalous-pixel-degradation sensing data (i.e., 170).

The sensing compensator 504 may substitute an average value of the degradation sensing data of the second sub-pixels positioned around the anomalous pixel PG5, for example, the second sub-pixels PG2, PG4, PG6, and PG8 positioned on upper, lower, left, and right sides of the anomalous pixel PG5, for the degradation sensing data of the anomalous pixel PG5 (e.g., degradation substitution data). The sensing compensator 504 may store the degradation substitution data (e.g., 190) of the anomalous pixel PG5 and the degradation sensing data of the peripheral second sub-pixels in the first LUT 508.

In an embodiment, the sensing compensator 504 may determine whether a difference value between degradation sensing data of third sub-pixels (e.g., blue sub-pixels) adjacent to each other is equal to or greater than a third threshold value. In the case where a specific third sub-pixel has a difference value equal to or greater than the third threshold value from peripheral third sub-pixels, it may be determined that the specific third sub-pixel is an anomalous pixel.

For example, in the case where degradation sensing data of a specific third sub-pixel PB5 is set to 165 and degradation sensing data of peripheral third sub-pixels PB1, PB2, PB3, PB4, PB6, PB7, PB8, and PB9 are respectively set to 193, 192, 192, 191, 193, 190, 192, and 192, it may be determined that the specific third sub-pixel PB5 is an anomalous pixel. The sensing compensator 504 may store the degradation sensing data corresponding to the anomalous pixel PB5 in the second LUT 510 as anomalous-pixel-degradation sensing data (i.e., 165).

The sensing compensator 504 may substitute an average value of the degradation sensing data of the third sub-pixels positioned around the anomalous pixel PB5, for example, the third sub-pixels PB2, PB4, PB6, and PB8 positioned on upper, lower, left, and right sides of the anomalous pixel PB5, for the degradation sensing data of the anomalous pixel PB5 (e.g., degradation substitution data). The sensing compensator 504 may store the degradation substitution data (e.g., 192) of the anomalous pixel PB5 and the degradation sensing data of the peripheral third sub-pixels in the first LUT 508.

Through the aforementioned process, during the sensing period SP, the sensing compensator 504 may store the degradation sensing data in the first LUT 508, and may store the anomalous-pixel-degradation sensing data in the second LUT 510.

In an embodiment, the sensing compensator 504 may determine an anomalous pixel using the information stored in the first LUT 508. In such an embodiment, the anomalous pixel determination process using the degradation threshold value may be omitted. The sensing compensator 504 may determine the anomalous pixel using the information stored in the first LUT 508, and may respectively store the degradation substitution data and anomalous-pixel-degradation sensing data of each of the anomalous pixels PR5, PG5, and PB5 in the first LUT 508 and the second LUT 510.

Thereafter, the sensing compensator 504 may determine degradation information about each of the pixels PX using initial sensing data and degradation sensing data stored in the first LUT 508, and may supply a first offset offset1 corresponding to degradation compensation to the controller 502.

In the case where only the first LUT 508 is used to compensate for degradation of the pixels PX, degradation of an anomalous pixel may not be appropriately compensated for. In other words, because the degradation information about the anomalous pixel is determined by the initial substitution data and the degradation substitution data, the actual degradation information about the anomalous pixel may not be reflected in the first offset offset1.

In this case, the anomalous pixel corresponding to the degradation of the pixels PX may be visible to a user in the form of a bright spot and/or a dark spot. In an embodiment of the disclosure, the degradation of the anomalous pixel may be additionally compensated for by updating the optical data included in the optical LUT 512. Details pertaining to the foregoing will be described with reference to FIG. 8.

Figure 8:
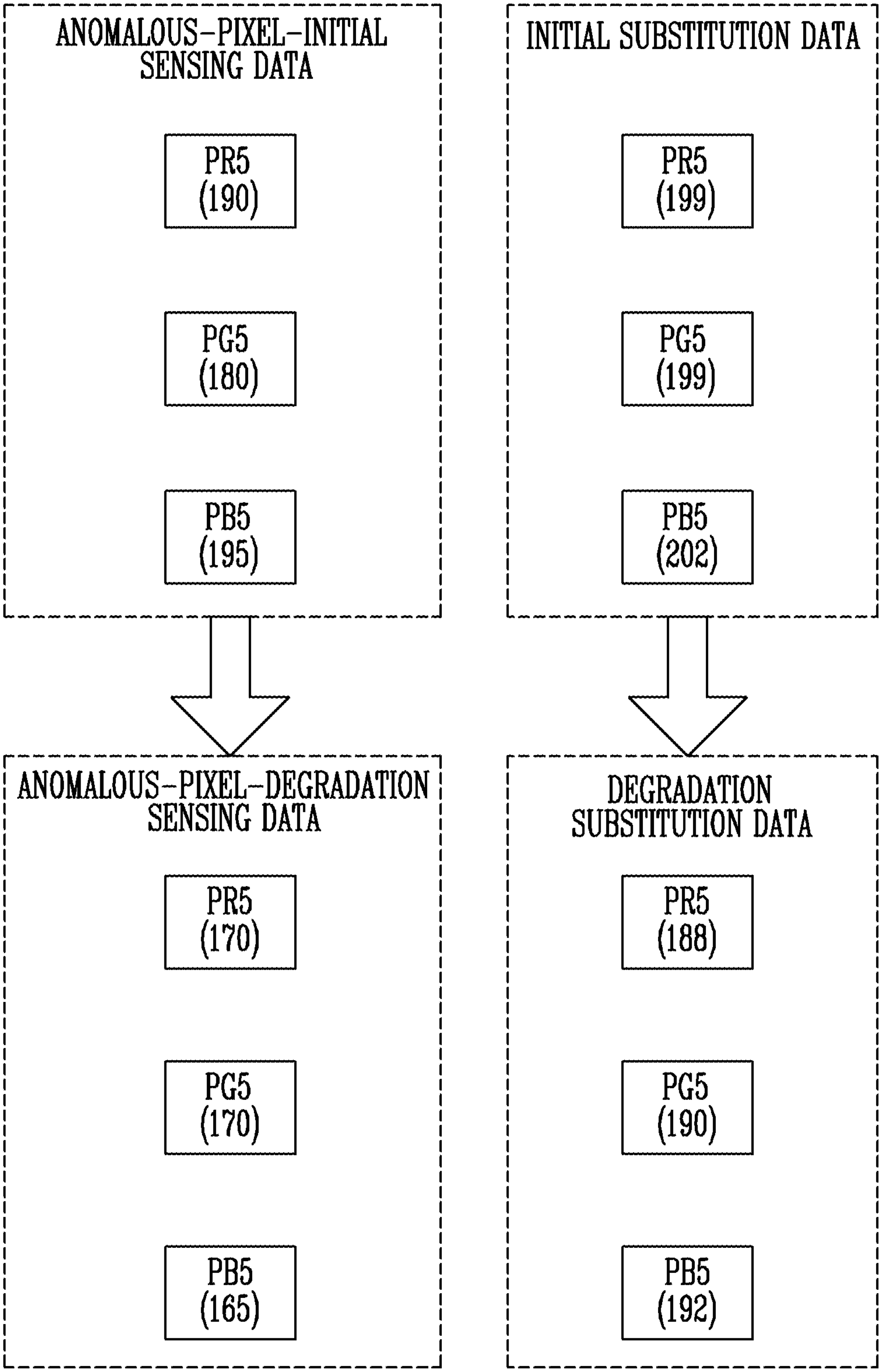
FIG. 8 is a diagram illustrating substitution data and sensing data of an anomalous pixel.

FIG. 8 is a diagram illustrating substitution data and sensing data of an anomalous pixel.

Referring to FIG. 8, in an embodiment, the optical compensator 506 may determine a degradation compensation value of the anomalous pixel using the initial substitution data PR5 (199), PG5 (199), and PB5 (202) and the degradation substitution data PR5 (188), PG5 (190), and PB5 (192). For example, it may be determined that a value obtained by subtracting the degradation substitution data PR5 (188), PG5 (190), and PB5 (192) from the initial substitution data PR5 (199), PG5 (199), and PB5 (202) is a degradation compensation value to be reflected in the first offset offset1.

In such an embodiment, the optical compensator 506 may determine an actual degradation value of the anomalous pixel using the anomalous-pixel-initial sensing data PR5 (190), PG5 (180), and PB5 (195) and anomalous-pixel-degradation sensing data PR5 (170), PG5 (170), and PB5 (165). For example, it may be determined that a value obtained by subtracting the anomalous-pixel-degradation sensing data PR5 (170), PG5 (170), and PB5 (165) from the anomalous-pixel-initial sensing data PR5 (190), PG5 (180), and PB5 (195) is the actual degradation value.

In an embodiment, the optical compensator 506 determines that the actual degradation value of the first sub-pixel PR5 is 20, and the degradation compensation value of the first sub-pixel PR5 reflected by the sensing compensator 504 is 11. The optical compensator 506 may change the optical data corresponding to the first sub-pixel PR5 so that the degradation of the first sub-pixel PR5 can be additionally compensated for. For example, the optical compensator 506 may change the optical data so that the luminance of light generated from the first sub-pixel PR5 can increase based on the same data.

In such an embodiment, the degradation threshold value may be previously stored in the optical LUT 512. In the case where a value obtained by subtracting the degradation compensation value from the actual degradation value is equal to or greater than the degradation threshold value, the optical compensator 506 may change the optical data so that the degradation of the anomalous pixel can be additionally compensated for.

In an embodiment, the optical compensator 506 determines that the actual degradation value of the second sub-pixel PG5 is 10, and the degradation compensation value of the second sub-pixel PG5 reflected by the sensing compensator 504 is 9. In such an embodiment, the optical compensator 506 determines that a value obtained by subtracting the degradation compensation value from the actual degradation value is set to a value less than the degradation threshold value, and the optical data corresponding to the second sub-pixel PG5 may be maintained.

In an embodiment, the optical compensator 506 determines that the actual degradation value of the third sub-pixel PB5 is 30, and the degradation compensation value of the third sub-pixel PB5 reflected by the sensing compensator 504 is 10. The optical compensator 506 may determine that a value obtained by subtracting the degradation compensation value from the actual degradation value is set to a value equal to or greater than the degradation threshold value, and may change the optical data corresponding to the third sub-pixel PB5 such that the degradation of the third sub-pixel PB5 can be additionally compensated for.

In this case, the degradation compensation value of the anomalous pixel may be included in the second offset offset2. In other words, the degradation of the anomalous pixel may be compensated for by changing the optical data corresponding to the anomalous pixel.

Figure 9:
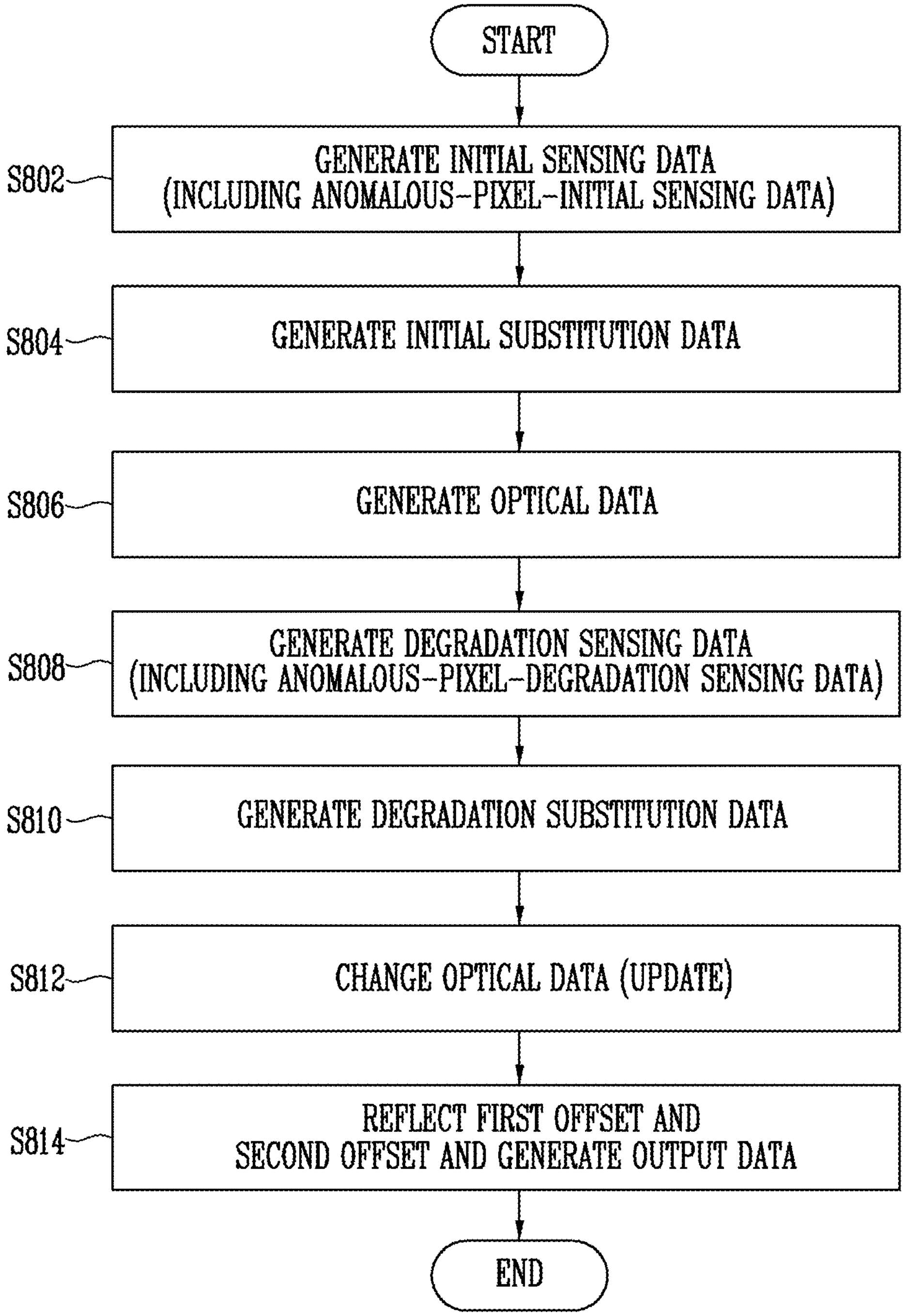
FIG. 9 is a diagram illustrating a method of driving the display device in accordance with an embodiment of the disclosure.

FIG. 9 is a diagram illustrating a method of driving the display device 10 in accordance with an embodiment of the disclosure.

Referring to FIG. 9, in an embodiment, the display device 10 may generate initial sensing data using the sensing driver 400 during a fabrication process (or at the first time point) (S802). The initial sensing data may include anomalous-pixel-initial sensing data. Initial sensing data sensed by the sensing driver 400 may be supplied to the sensing compensator 504.

The sensing compensator 504 may generate initial substitution data corresponding to an average value of peripheral pixels related to the anomalous pixel (S804). The sensing compensator 504 may store the initial sensing data including the initial substitution data in the first LUT 508, and may store the anomalous-pixel-initial sensing data in the second LUT 510.

Thereafter, during the fabrication process, optical data may be generated through optical compensation (S806). The optical compensator 506 may store the optical data in the optical LUT 512.

The sensing driver 400 may generate degradation sensing data during the sensing period SP (or at the second time point) after the display device 10 is shipped out (S808). The degradation sensing data may include anomalous-pixel-degradation sensing data.

The sensing compensator 504 may generate degradation substitution data corresponding to an average value of the peripheral pixels related to the anomalous pixel (S810). The sensing compensator 504 may store the degradation sensing data including the degradation substitution data in the first LUT 508, and may store the anomalous-pixel-degradation sensing data in the second LUT 510.

Subsequently, the optical compensator 506 may compensate for degradation of the anomalous pixel using the anomalous-pixel-initial sensing data, the initial substitution data, the anomalous-pixel-degradation sensing data, and the degradation substitution data. In an embodiment, for example, the optical compensator 506 may change the optical data corresponding to the anomalous pixel such that the degradation of the anomalous pixel can be compensated for (S812).

Thereafter, an output data generator 5022 may reflect the first offset offset1 supplied from the sensing compensator 504 and the second offset offset2 supplied from the optical compensator 506 in input data Din and generate output data Dout (S814). The data driver 300 may generate a data signal using the output data Dout, and supply the data signal to the pixels PX.

Figure 10:
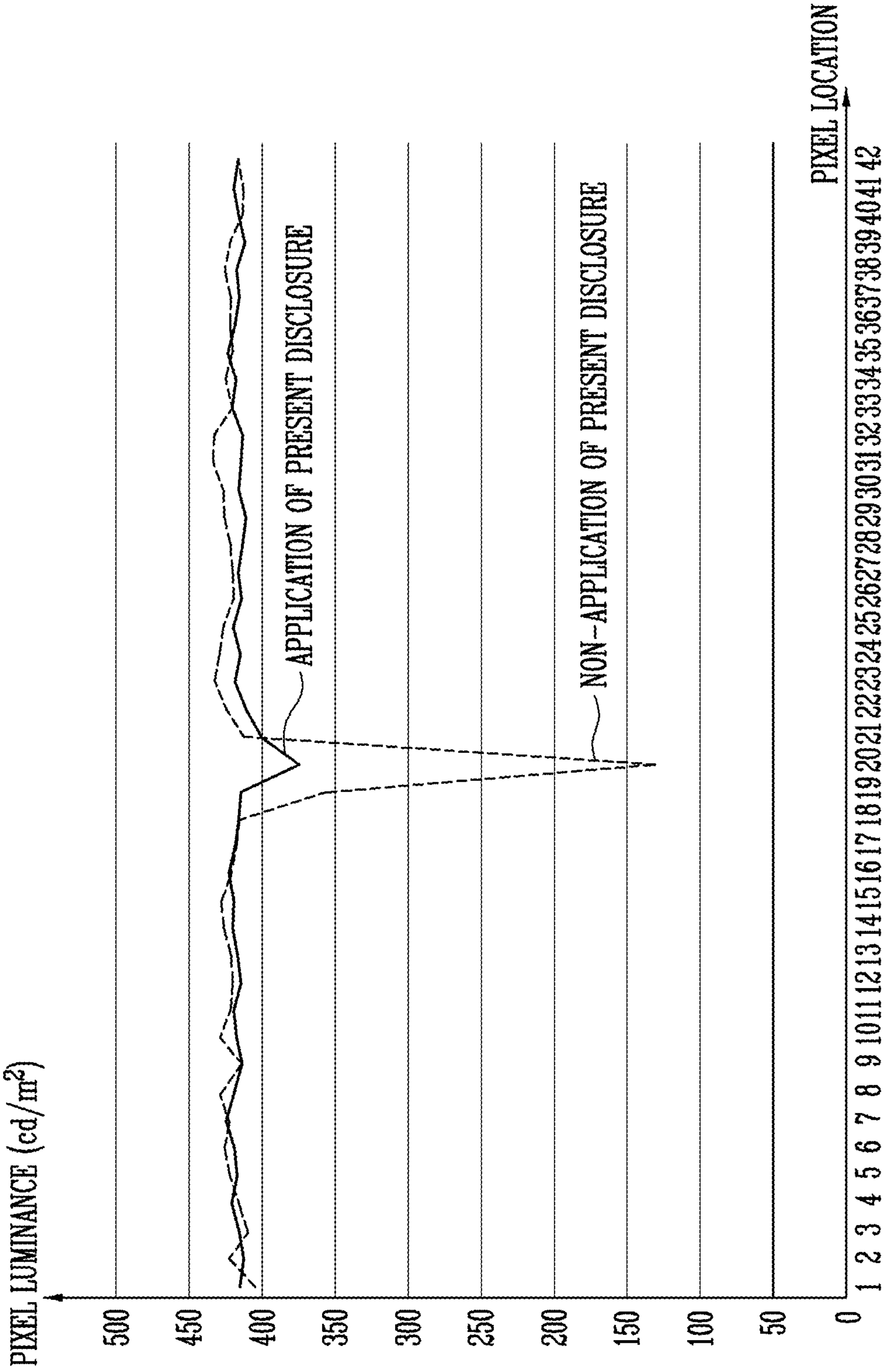
FIG. 10 is a diagram illustrating the luminance of an anomalous pixel in accordance with an embodiment of the disclosure.

FIG. 10 is a diagram illustrating the luminance of an anomalous pixel in accordance with an embodiment of the disclosure. FIG. 10 illustrates the luminance after the anomalous pixel is degraded. In FIG. 10, a Y-axis refers to the luminance, and an X-axis refers to the locations of the pixels.

Referring to FIG. 10, in the case where an embodiment of the disclosure is not applied, the luminance of the anomalous pixel may be set to a value significantly lower than that of peripheral pixels. In this case, the anomalous pixel may be visible to the user as a dark spot. On the other hand, in the case where an embodiment of the disclosure is applied, the luminance of the anomalous pixel may be set to a value similar to that of the peripheral pixels. In this case, the anomalous pixel may not be visible to the user.

Figure 11:
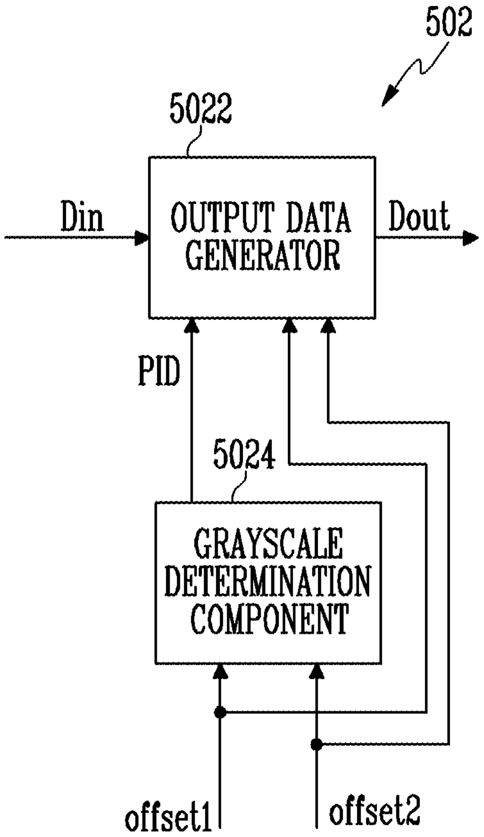
FIG. 11 is a diagram illustrating an embodiment of the controller illustrated in FIGS. 4 and 5.

FIG. 11 is a diagram illustrating an embodiment of the controller illustrated in FIGS. 4 and 5.

Referring to FIG. 11, a controller 502 in accordance with an embodiment of the disclosure may include an output data generator 5022 and a grayscale determination component 5024.

The grayscale determination component 5024 may receive a first offset offset1 from the sensing compensator 504, and may receive a second offset offset2 from the optical compensator 506. In addition, the grayscale determination component 5024 may receive input data Din from an external processor. The grayscale determination component 5024 may determine whether degradation of an anomalous pixel can be compensated for within a preset maximum grayscale value (e.g., grayscale value 255).

In an embodiment, for example, the grayscale determination component 5024 may use the first offset offset1 and the second offset offset2 corresponding to the anomalous pixel to determine whether the degradation of the anomalous pixel can be compensated for within the maximum grayscale value. For example, in the case where it is determined that a grayscale value equal to or greater than the maximum grayscale value is to compensate for the degradation of the anomalous pixel, pixel information data PID corresponding to information about the anomalous pixel may be supplied to the output data generator 5022.

The output data generator 5022 may reflect the first offset offset1 and the second offset offset2 in the input data Din and generate the output data Dout. Here, the output data generator 5022 may additionally increase the luminance of the peripheral pixels adjacent to the anomalous pixel in the case where the pixel information data PID is inputted thereto. The user may recognize an average luminance of the anomalous pixel and the peripheral pixels as the luminance of the pixel component 100, and accordingly, additional compensation for the degradation of the anomalous pixel can be implemented.

Figure 12:
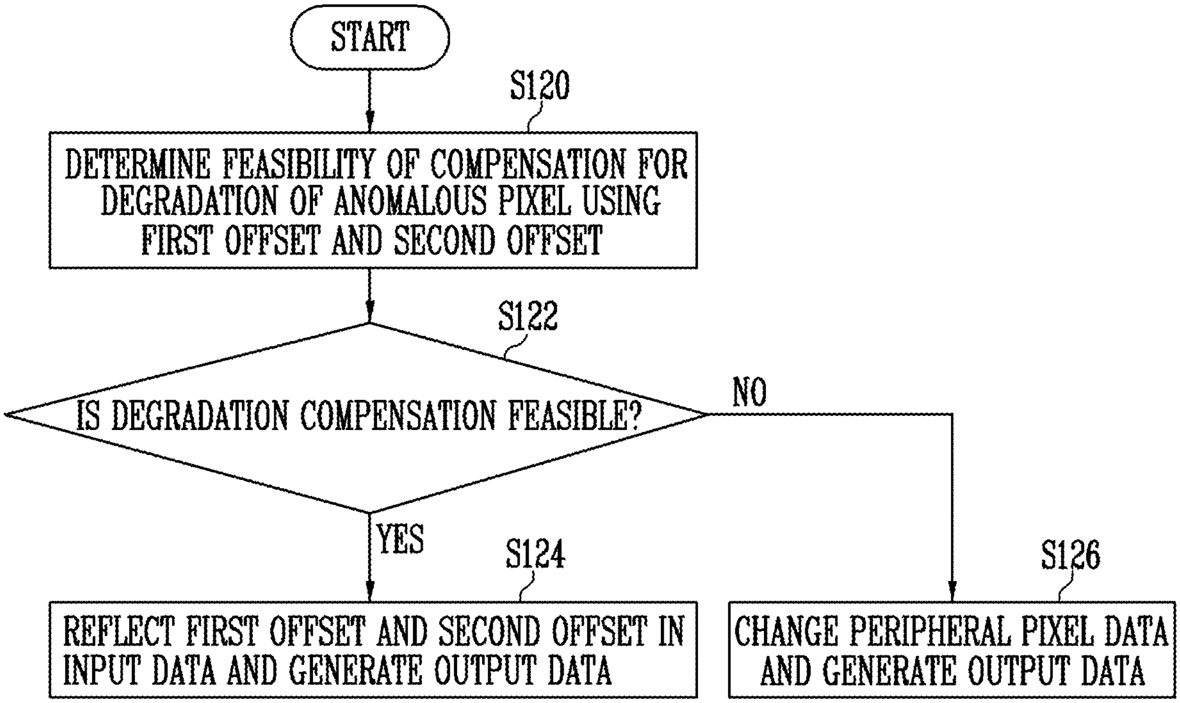
FIG. 12 is a diagram illustrating an operation process of a grayscale determination component illustrated in FIG. 11.

FIG. 12 is a diagram illustrating an operation process of the grayscale determination component 5024 illustrated in FIG. 11.

Referring to FIG. 12, in an embodiment, the grayscale determination component 5024 may determine whether compensation for degradation of the anomalous pixel is feasible using the first offset offset1 and the second offset offset2 (S120 and S122). For example, the grayscale determination component 5024 may determine whether degradation compensation is feasible within the maximum grayscale value that can be represented by the display device 10. In the case where the degradation compensation is feasible (YES in S122), the grayscale determination component 5014 does not generate pixel information data PID. In this case, the output data generator 5022 may reflect the first offset offset1 and the second offset offset2 in the input data Din (S124) and generate the output data Dout.

In the case where it is determined that the degradation compensation is not feasible (NO in S122), the grayscale determination component 5024 may generate the pixel information data PID and supply the pixel information data PID to the output data generator 5022. The output data generator 5022 supplied with the pixel information data PID may compare the luminance of the peripheral pixels adjacent to the anomalous pixel with a desired grayscale value and increase the luminance of the peripheral pixels. In the case where the luminance of the luminance of the peripheral pixels adjacent to the anomalous pixel increases, additional compensation for the degradation of the anomalous pixel may be implemented.

Figure 13:
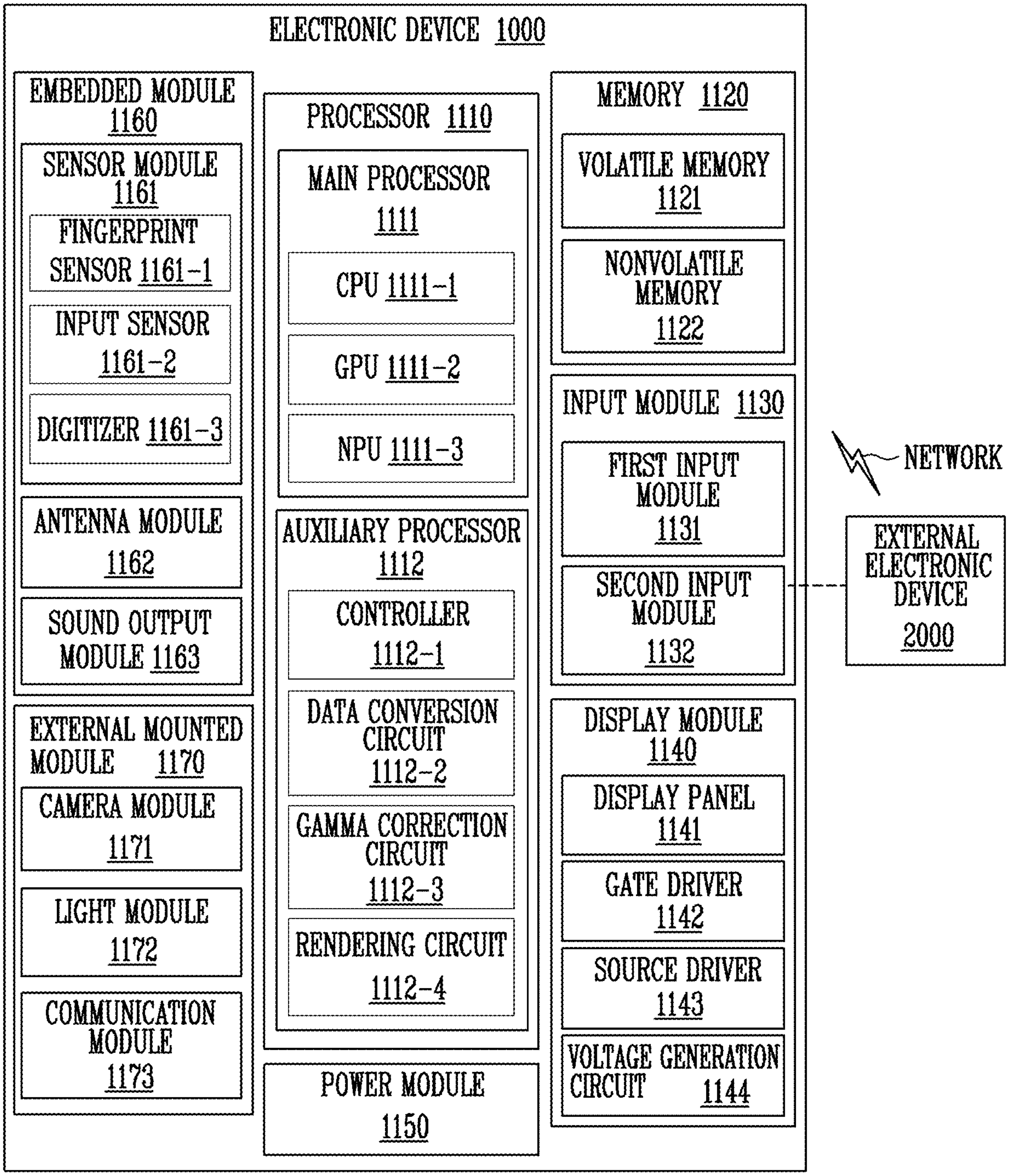
FIG. 13 is a diagram illustrating an electronic device in accordance with an embodiment of the disclosure.

FIG. 13 is a diagram illustrating an electronic device in accordance with an embodiment of the disclosure.

Referring to FIG. 13, the electronic device 1000 in accordance with an embodiment of the disclosure may output a variety of information through a display module 1140. When a processor 1110 executes an application stored in a memory 1120, the display module 1140 may provide application information to the user through a display panel 1141.

The processor 1110 may acquire an external input through an input module 1130 or a sensor module 1161, and execute an application corresponding to the external input. For example, in the case where the user selects a camera icon (or a camera application icon) displayed on the display panel 1141, the processor 1110 may acquire a user input through an input sensor 1161-2, and activate a camera module 1171. The processor 1110 may transmit image data corresponding to an image captured by the camera module 1171 to the display module 1140. The display module 1140 may display, on the display panel 1141, an image corresponding to the captured image.

For example, in the case where personal information authentication is executed through the display module 1140, a fingerprint sensor 1161-1 may acquire inputted fingerprint information as input data. The processor 1110 may compare input data acquired through the fingerprint sensor 1161-1 with authentication data stored in the memory 1120, and may execute an application depending on a result of the comparison. The display module 1140 may display, on the display panel 1141, information executed according to the logic of the application. The fingerprint sensor 1161-1 may be disposed to make it possible to acquire fingerprint information in the overall area of the display module 1140 (or the display panel 1141).

For example, in the case where a music streaming icon displayed on the display module 1140 is selected, the processor 1110 may acquire a user input through the input sensor 1161-2, and activate a music streaming application stored in the memory 1120. When a music playing command is inputted in the music streaming application, the processor 1110 may activate a sound output module 1163 and provide sound information corresponding to the music playing command to the user.

Hitherto, a brief description of the operation of the electronic device 1000 has been provided. Hereinafter, the configuration of the electronic device 1000 will be described in detail. Some of the components of the electronic device 1000 to be described below may be integrated into a single component, or one component may be separated into two or more components.

The electronic device 1000 may communicate with an external electronic device 2000 through a network (e.g., a short-range wireless communication network or a long-range wireless communication network). In an embodiment, the electronic device 1000 may include a processor 1110, a memory 1120, an input module 1130, a display module 1140, a power module 1150, an embedded module 1160, and an external mounted module 1170. In an embodiment, in the electronic device 1000, at least one of the foregoing components may be omitted, or one or more other components may be added. In an embodiment, some components (e.g., the sensor module 1161, an antenna module 1162, or the sound output module 1163) among the foregoing components may be integrated into another component (e.g., the display module 1140).

The processor 1110 may execute software to control at least one other component (e.g., a hardware or software component) of the electronic device 1000 connected to the processor 1110 and perform various data processing or computing operations. In an embodiment, as at least a portion of a data processing or computing operation, the processor 1110 may store a command or data received from another component (e.g., the input module 1130, the sensor module 1161, or a communication module 1173) in a volatile memory 1121, process the command or data stored in the volatile memory 1121, and store result data in a nonvolatile memory 1122.

The processor 1110 may include a main processor 1111 and an auxiliary processor 1112. The main processor 1111 may include one or more of a central processing unit (CPU) 1111-1 and an application processor (AP). The main processor 1111 may further include any one or more of a graphic processing unit (GPU) 1111-2, a communication processor (CP), and an image signal processor (ISP). The main processor 1111 may further include a neural processing unit (NPU) 1111-3. The NPU 1111-3 may be a processor specialized to process an artificial intelligence model. The artificial intelligence model may be generated by machine learning. The artificial intelligence model may include a plurality of artificial neural network layers. An artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-networks, or a combination of two or more among the foregoing networks, but is not limited thereto. The artificial intelligence model may not only include a hardware structure but may also include an additional or substitutive software structure. At least two of the foregoing processing units and the processors may be implemented as a single integrated component (e.g., a single chip). Alternatively, the processing units and the processors may be implemented as respective independent components (e.g., a plurality of chips).

The auxiliary processor 1112 may include a controller 1112-1. The controller 1112-1 may include an interface conversion circuit and a timing control circuit. For example, the controller 1112-1 may include the timing controller 500 shown in FIG. 1. For example, the controller 1112-1 may include at least one component of the controller 502, the sensing compensator 504, and the optical compensator 506 shown in FIG. 4. In addition, the controller 1112-1 may include at least one of the first LUT 508, the second LUT 510, and the optical LUT 512 shown in FIG. 4.

The controller 1112-1 may receive an image signal from the main processor 1111, and may convert a data format of the image signal to a format corresponding to specifications of an interface with the display module 1140 and output image data. The controller 1112-1 may output various control signals needed to drive the display module 1140.

The auxiliary processor 1112 may further include a data conversion circuit 1112-2, a gamma correction circuit 1112-3, a rendering circuit 1112-4, a touch control circuit 1112-5, which is not shown, and the like. The data conversion circuit 1112-2 may receive image data from the controller 1112-1, compensate for the image data to display an image at a desired luminance based on characteristics of the electronic device 1000 or settings of the user, or may convert the image data to reduce power consumption or compensate for after-images.

For example, the data conversion circuit 1112-2 may include at least one component of the sensing compensator 504, and the optical compensator 506 shown in FIG. 4. For instance, the data conversion circuit 1112-2 may include at least one of the first LUT 508, the second LUT 510, and the optical LUT 512. In this case, the data conversion circuit 1112-2 along with the controller 1112-1 may be integrated into a single IC.

The gamma correction circuit 1112-3 may convert image data, a gamma reference voltage, or the like so that an image to be displayed on the electronic device 1000 can have desired gamma characteristics. The rendering circuit 1112-4 may receive image data from the controller 1112-1, and render the image data taking into account pixel arrangement or the like on the display panel 1141 applied to the electronic device 1000.

The touch control circuit may supply a touch signal to the input sensor 1161-2, and receive a sensing signal from the input sensor 1161-2 in response to the touch signal.

At least one among the data conversion circuit 1112-2, the gamma correction circuit 1112-3, the rendering circuit 1112-4, and the touch control circuit may be integrated into another component (e.g., the main processor 1111 or the controller 1112-1). At least one among the data conversion circuit 1112-2, the gamma correction circuit 1112-3, and the rendering circuit 1112-4 may be integrated into a source driver 1143 to be described below.

The memory 1120 may store a variety of data to be used in at least one component (e.g., the processor 1110 or the sensor module 1161) of the electronic device 1000, and input data or output data for a command pertaining to the variety of data. Furthermore, the memory 1120 may store a variety of setting data corresponding to settings of the user. The memory 1120 may include at least one or more of the volatile memory 1121 and the nonvolatile memory 1122. The memory 1120 may include at least one of the first LUT 508, the second LUT 510, and the optical LUT 512 shown in FIG. 4.

The input module 1130 may receive a command or data to be used in a component (e.g., the processor 1110, the sensor module 1161, or the sound output module 1163) of the electronic device 1000 from an external device (e.g., the user or an external electronic device 2000) provided outside the electronic device 1000.

The input module 1130 may include a first input module 1131 configured to receive a command or data from the user, and a second input module 1132 configured to receive a command or data from the external electronic device 2000. The first input module 1131 may include a microphone, a mouse, a keyboard, a key (e.g., a button), or a pen (e.g., a passive pen or an active pen). The second input module 1132 may support a designated protocol, which can be connected to the external electronic device 2000 in a wired or wireless manner. In an embodiment, the second input module 1132 may include a high definition multimedia interface (HDMI), a universal serial bus (USB) interface, an SD card interface, or an audio interface. The second input module 1132 may include a connector, e.g., an HDMI connector, a USB connector, an SD card connector, or an audio connector (e.g., a headphone connector), for physical connection with the external electronic device 2000.

The display module 1140 may provide visual information to the user. The display module 1140 may include a display panel 1141, a gate driver 1142, and a source driver 1143. The display module 1140 may further include a window, a chassis, and a bracket to protect the display panel 1141.

The display panel 1141 (or a display) may include a liquid crystal display panel, an organic light emitting display panel, or an inorganic light emitting display panel. The type of display panel 1141 is not limited to a particular type. The display panel 1141 is a rigid type panel, or a flexible type panel, which is rollable or foldable. The display module 1140 may further include a support, a bracket, or a heat dissipater, which supports the display panel 1141.

The display panel 1141 may receive image data from the auxiliary processor 1112, and display images while controlling the amount of current flowing from the first driving voltage (or first driving power supply) VDD to the second driving voltage (or second driving power supply) VSS via the pixels PX in correspondence with the image data. The display panel 1141 may correspond to the pixel component 100 illustrated in FIG. 1.

The gate driver 1142 may be mounted on the display panel 1141 as a driving chip. The gate driver 1142 may be integrated on the display panel 1141. For example, the gate driver 1142 may include an amorphous silicon TFT gate (ASG) driver circuit, a low temperature polycrystalline silicon (LTPS) TFT gate driver circuit, or an oxide semiconductor TFT gate (OSG) driver circuit, which is internalized in the display panel 1141. The gate driver 1142 may receive a control signal from the controller 1112-1, and output scan signals to the display panel 1141 in response to the control signal. The gate driver 1142 may include the scan driver 200 illustrated in FIG. 1.

The display module 1140 may further include an emission driver. The emission driver may output an emission control signal to the display panel 1141 in response to a control signal received from the controller 1112-1. The emission driver may be formed separately from the gate driver 1142, or may be integrated into the gate driver 1142.

The source driver 1143 may receive a control signal from the controller 1112-1, convert image data to an analog voltage (e.g., a data signal) in response to the control signal, and output data signals to the display panel 1141. The source driver 1143 may include the data driver 300 illustrated in FIG. 1.

The source driver 1143 may be integrated into another component (e.g., the controller 1112-1). The functions of the interface conversion circuit and the timing control circuit of the controller 1112-1 may be integrated into the source driver 1143.

The display module 1140 may further include a voltage generation circuit 1144. The voltage generation circuit 1144 may output various voltages needed to drive the display panel 1141. For example, the voltage generation circuit 1144 may generate the first driving voltage VDD, the second driving voltage VSS, and the initialization voltage VINT.

In an embodiment, the display panel 1141 may include a plurality of pixel columns each including a plurality of pixels.

In an embodiment, the source driver 1143 may convert data that is included in image data received from the processor 1110 and corresponds to red (R), green (G), and blue (B) to a red data signal (or a data voltage), a green data signal, and a blue data signal, and provide the data signals to a plurality of pixel columns included in the display panel 1141 during a single horizontal period.

The power module 1150 may supply power to the components of the electronic device 1000. The power module 1150 may include a battery to store power voltage. The battery may include a primary cell, which cannot be recharged, and a secondary cell or a fuel cell, which are rechargeable. The power module 1150 may include a power management integrated circuit (PMIC). The PMIC may supply optimized power to each of the foregoing modules and modules to be described below. The power module 1150 may include a wireless power transceiver that is electrically connected with the battery. The wireless power transceiver may include a plurality of coiled antenna radiators. The voltage generation circuit 1144 may be integrated with the power module 1150.

The electronic device 1000 may further include an embedded module 1160 and an external mounted module 1170. The embedded module 1160 may include a sensor module 1161, an antenna module 1162, and a sound output module 1163. The external mounted module 1170 may include a camera module 1171, a light module 1172, and a communication module 1173.

The sensor module 1161 may sense an input from the body of the user or an input from a pen of the first input module 1131, and generate an electric signal or a data value corresponding to the input. The sensor module 1161 may include at least one or more among a fingerprint sensor 1161-1, an input sensor 1161-2, and a digitizer 1161-3.

The fingerprint sensor 1161-1 may generate a data value corresponding to the fingerprint of the user. The fingerprint sensor 1161-1 may include any one of an optical fingerprint sensor and a capacitive fingerprint sensor.

The input sensor 1161-2 may generate a data value corresponding to coordinate information of the input from the body of the user or the input from the pen. The input sensor 1161-2 may generate a data value corresponding to the amount of change in capacitance by the input. The input sensor 1161-2 may sense an input from a passive pen, or transmit or receive data to or from an active pen.

The input sensor 1161-2 may measure a biometric signal pertaining to biometric information such as a blood pressure, body fluid, or body fat. For example, in the case where the user brings a part of his/her body into contact with the sensor layer or the sensing panel and remains stationary for a certain time, the input sensor 1161-2 may sense a biometric signal, based on a change in electric field by the part of his/her body, and output information desired by the user to the display module 1140.

The digitizer 1161-3 may generate a data value corresponding to coordinate information of an input from a pen. The digitizer 1161-3 may generate data values corresponding to electromagnetic variations caused by the input. The digitizer 1161-3 may sense an input from a passive pen, or transmit or receive data to or from an active pen.

At least one of the fingerprint sensor 1161-1, the input sensor 1161-2, and the digitizer 1161-3 may be implemented as a sensor layer formed on the display panel 1141 through a successive process. At least one among the fingerprint sensor 1161-1, the input sensor 1161-2, and the digitizer 1161-3 may be disposed over the display panel 1141. Any one among the fingerprint sensor 1161-1, the input sensor 1161-2, and the digitizer 1161-3, for example, the digitizer 1161-3, may be disposed under the display panel 1141.

At least two or more among the fingerprint sensor 1161-1, the input sensor 1161-2, and the digitizer 1161-3 may be formed to be integrated into a single sensing panel through the same process. In the case where at least two or more among the fingerprint sensor 161-1, the input sensor 161-2, and the digitizer 161-3 are integrated into a single sensing panel, the sensing panel may be disposed between the display panel 1141 and a window disposed over the display panel 1141. In an embodiment, the sensing panel may be disposed on the window, and the position of the sensing panel is not particularly limited.

At least one selected from the fingerprint sensor 1161-1, the input sensor 1161-2, and the digitizer 1161-3 may be embedded in the display panel 1141. In other words, during a process of forming components (e.g., a light emitting element, a transistor, and the like) included in the display panel 1141, at least one among the fingerprint sensor 1161-1, the input sensor 1161-2, and the digitizer 1161-3 may be formed simultaneously with the components.

In addition, the sensor module 1161 may generate an electrical signal or data value corresponding to internal conditions or external conditions of the electronic device 1000. The sensor module 1161 may further include, for example, a gesture sensor, a gyroscope sensor, an atmospheric sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The antenna module 1162 may include one or more antennas to transmit or receive a signal or power to or from an external device. In an embodiment, the communication module 1173 may transmit a signal to an external electronic device or receive a signal from the external electronic device through an antenna suitable for a communication scheme. An antenna pattern of the antenna module 1162 may be integrated to a component of the display module 1140 (e.g., the display panel 1141 of the display module 1140) or the input sensor 1161-2.

The sound output module 1163 may be a device for outputting a sound signal to a device provided outside the electronic device 1000, and, for example, may include a speaker, which is used for typical purposes such as reproducing multimedia or record data, and a receiver, which is used only for phone reception. In an embodiment, the receiver may be integrally or separately formed with a speaker. A sound output pattern of the sound output module 1163 may be integrated into the display module 1140.

The camera module 1171 may capture a static image or a video. In an embodiment, the camera module 1171 may include one or more lenses, an image sensor, or an image signal processor. The camera module 1171 may further include an infrared camera capable of sensing the presence of the user, the position of the user, a line of sight of the user, etc.

The light module 1172 may provide light. The light module 1172 may include a light emitting diode or a xenon lamp. The light module 1172 may be operated interlocking with the camera module 1171 or operated independently therefrom.

The communication module 1173 may form a wired or wireless communication channel between the electronic device 1000 and the external electronic device 2000, and support execution of communication through the formed communication channel. The communication module 1173 may include either or both a wireless communication module such as a cellular communication module, a short-range wireless communication module, or a global navigation satellite system (GNSS) communication module, and a wired communication module such as a local area network (LAN) communication module, or a power line communication module. The communication module 1173 may communicate with the external electronic device 2000 through a short-range communication network such as Bluetooth, WiFi Direct or infrared data association (IrDA), or a long-range communication network such as a cellular network, an internet, or a computer network (e.g., LAN or WAN). The various types of communication modules 1173 described above may be implemented as a single chip or may be implemented as respective separate chips.

The input module 1130, the sensor module 1161, the camera module 1171, and the like, interlocking with the processor 1110, may be used to control the operation of the display module 1140.

The processor 1110 may output a command or data to the display module 1140, the sound output module 1163, the camera module 1171, or the light module 1172, based on input data received from the input module 1130. For example, the processor 1110 may generate image data in response to input data applied through a mouse, an active pen, or the like and output the image data to the display module 1140, or may generate command data in response to input data and output the command data to the camera module 1171 or the light module 1172. In the case where input data is not received from the input module 1130, the processor 1110 may convert the operation mode of the electronic device 1000 to a low-power mode or a sleep mode, thus reducing the power consumption of the electronic device 1000.

The processor 1110 may output a command or data to the display module 1140, the sound output module 1163, the camera module 1171, or the light module 1172, based on sensing data received from the sensor module 1161. For example, the processor 1110 may compare authentication data applied from the fingerprint sensor 1161-1 with the authentication data stored in the memory 1120, and may execute an application depending on a result of the comparison. The processor 1110 may execute a command based on sensing data sensed by the input sensor 1161-2 or the digitizer 1161-3, or output corresponding image data to the display module 1140. In the case where the sensor module 1161 includes a temperature sensor, the processor 1110 may receive temperature data for a measured temperature from the sensor module 1161, and further execute a luminance correction operation for the image data based on the temperature data.

The processor 1110 may receive measurement data for the presence of the user, the position of the user, a line of sight of the user, or the like from the camera module 1171. The processor 1110 may further execute a luminance correction operation for the image data based on the measurement data. For example, the processor 1110 that has determined whether the user is through an input from the camera module 1171 may output, to the display module 1140, image data the luminance of which is corrected by the data conversion circuit 1112-2 or the gamma correction circuit 1112-3.

Some components among the foregoing components may be connected to each other by a communication scheme, e.g., a bus, general purpose input/output (GPIO), a serial peripheral interface (SPI), a mobile industry processor interface (MIPI), or an ultra path interconnect (UPI) link, which can be used between peripheral devices, and may thus exchange a signal (e.g., a command or data) therebetween. The processor 1110 may communicate with the display module 1140 through a predefined interface. For example, any one of the foregoing communication schemes may be used, and the interface is not limited to the foregoing communication schemes.

In a display device, a method of driving the display device, and an electronic device including the display device in accordance with embodiments of the disclosure, degradation of an anomalous pixel may be compensated for using initial sensing data of the anomalous pixel and degradation sensing data of the anomalous pixel.

As described above, in the case where the degradation of the anomalous pixel is compensated for, the anomalous pixel can be effectively prevented from being visible as a dark spot or a bright spot as usage time increases. Accordingly, display quality can be improved.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device, comprising:

a pixel component including pixels; and a timing controller which controls the pixel component, wherein the timing controller comprises:

a first look-up table which stores pieces of initial sensing data generated by sensing characteristics of the pixels at a first time point, and stores pieces of degradation sensing data generated by sensing characteristics of the pixels at a second time point;

a second look-up table which stores initial sensing data of an anomalous pixel having a value difference equal to or greater than an initial threshold value from pieces of initial sensing data of peripheral pixels among the pieces of initial sensing data, and stores degradation sensing data of the anomalous pixel;

an optical look-up table which stores pieces of optical data, based on which optical compensation of the pixels is performed; and an optical compensator which updates the pieces of optical data with reference to pieces of initial sensing data and the pieces of degradation sensing data of the first look-up table and the sensing data of an anomalous pixel and the degradation sensing data of the anomalous pixel of the second look-up table to compensate for degradation of the anomalous pixel.

2. The display device according to claim 1, further comprising:

a sensing driver which senses the pieces of initial sensing data based on sensing current supplied from the pixels at the first time point, and senses the pieces of degradation sensing data based on the sensing current supplied from the pixels at the second time point.

3. The display device according to claim 1, wherein the first time point is a specific time point during a fabrication process, and wherein the second time point is a specific time point after the display device is shipped out.

4. The display device according to claim 1, wherein the timing controller further comprises a sensing compensator which stores the initial sensing data and the degradation sensing data in the first look-up table, and stores the pieces of initial sensing data of the anomalous pixel and the pieces of degradation sensing data of the anomalous pixel in the second look-up table.

5. The display device according to claim 4, wherein the pieces of initial sensing data include initial substitution data obtained by changing the initial sensing data of the anomalous pixel to an average value of the pieces of initial sensing data of the peripheral pixels, and wherein the pieces of degradation sensing data include degradation substitution data obtained by changing the degradation sensing data of the anomalous pixel to an average value of the degradation sensing data of the peripheral pixels.

6. The display device according to claim 5, wherein the optical compensator updates the optical data corresponding to the anomalous pixel using the initial sensing data of the anomalous pixel, the degradation sensing data of the anomalous pixel, the initial substitution data of the anomalous pixel and the degradation sensing data of the anomalous pixel.

7. The display device according to claim 6, wherein the optical compensator determines an actual degradation value of the anomalous pixel using the initial sensing data of the anomalous pixel and the degradation sensing data of the anomalous pixel, and wherein the optical compensator determines a degradation compensation value of the anomalous pixel using the initial substitution data of the anomalous pixel and the degradation substitution data of the anomalous pixel.

8. The display device according to claim 7, wherein the optical compensator changes the optical data corresponding to the anomalous pixel when a value obtained by subtracting the degradation compensation value from the actual degradation value is equal to or greater than a preset degradation threshold value.

9. The display device according to claim 4, wherein the timing controller further comprises a controller which generates output data using input data from an external device, wherein the controller comprises an output data generator which receives the input data, a first offset supplied from the sensing compensator based on the first look-up table and a second offset supplied from the optical compensator based on the optical look-up table, and generates the output data based on the input data, the first offset and the second offset.

10. The display device according to claim 9, wherein the controller further comprises a grayscale determination component which receives the first offset and the second offset and determines whether compensation for degradation of the anomalous pixel within a maximum grayscale value is feasible, and increases a luminance of the peripheral pixels when determined that the compensation is not feasible.

11. The display device according to claim 1, wherein the peripheral pixels emit light of a color identical to the anomalous pixel, and wherein the peripheral pixels are positioned adjacent to the anomalous pixel.

12. The display device according to claim 1, wherein the peripheral pixels emit light of colors different from the anomalous pixel, and wherein the peripheral pixels are positioned adjacent to the anomalous pixel.

13. A method of driving a display device, the method comprising:

determining an anomalous pixel using pieces of initial sensing data, which are sensed from pixels at a first time point, and generating initial substitution data by substituting anomalous-pixel-initial sensing data corresponding to the anomalous pixel with another value;

generating pieces of optical data corresponding to optical compensation for the pixels;

generating degradation substitution data by substituting anomalous-pixel-degradation sensing data corresponding to the anomalous pixel among pieces of degradation sensing data, which are sensed from the pixels at a second time point, with another value; and changing optical data corresponding to the anomalous pixel using the initial substitution data, the anomalous-pixel-initial sensing data, the degradation substitution data, and the anomalous-pixel-degradation sensing data.

14. The method according to claim 13, wherein the first time point is a specific time point during a process of fabricating the display device, and wherein the second time point is a specific time point after the display device is shipped out.

15. The method according to claim 13, wherein the initial sensing data of the anomalous pixel differs from the initial sensing data of peripheral pixels by a value difference equal to or greater than a threshold value.

16. The method according to claim 13, wherein the initial substitution data is generated by averaging the pieces of initial sensing data of peripheral pixels of the anomalous pixel.

17. The method according to claim 13, wherein the degradation substitution data is generated by averaging the pieces of degradation sensing data of peripheral pixels of the anomalous pixel.

18. The method according to claim 13, further comprising:

determining an actual degradation value of the anomalous pixel using the anomalous-pixel-initial sensing data and the anomalous-pixel-degradation sensing data;

determining a degradation compensation value of the anomalous pixel using the initial substitution data and the degradation substitution data; and changing the optical data corresponding to the anomalous pixel when a value obtained by subtracting the degradation compensation value from the actual degradation value is equal to or greater than a preset degradation threshold value.

19. The method according to claim 18, further comprising:

generating a first offset using the pieces of initial sensing data, the initial substitution data, the pieces of degradation sensing data, and the degradation substitution data;

generating a second offset using the pieces of optical data; and generating output data by reflecting the first offset and the second offset in input data.

20. The method according to claim 19, further comprising:

receiving the first offset and the second offset and determining whether compensation for degradation of the anomalous pixel is feasible, and increasing a luminance of peripheral pixels positioned around the anomalous pixel when determined that the compensation is not feasible.

21. An electronic device comprising:

a first look-up table which stores pieces of initial sensing data including initial characteristics of pixels, and pieces of degradation sensing data including degradation characteristics of the pixels;

a second look-up table which stores initial sensing data of an anomalous pixel having abnormal luminance characteristics among the pixels, and degradation sensing data of the anomalous pixel;

an optical look-up table which stores pieces of optical data corresponding to optical characteristics of the pixels; and a controller which generates output data based on data stored in the first look-up table, the second look-up table, and the optical look-up table, wherein the controller changes optical data corresponding to the anomalous pixel based the pieces of initial sensing data and the pieces of degradation sensing data of the first look-up table and the sensing data of an anomalous pixel and the degradation sensing data of the anomalous pixel of the second look-up table in a way such that degradation of the anomalous pixel is compensated for.

* * * * *